US011694191B2

United States Patent
Vora et al.

(10) Patent No.: US 11,694,191 B2
(45) Date of Patent: Jul. 4, 2023

(54) DIGITAL PAYMENTS LINKED TO GEOGRAPHIC LOCATIONS

(71) Applicant: PayTile LLC, Blue Ash, OH (US)

(72) Inventors: Anushree Vora, Mason, OH (US); Andrew M. Magruder, Blue Ash, OH (US)

(73) Assignee: PayTile LLC, Blue Ash, OH (US)

( * ) Notice: Subject to any disclaimer, the term of this patent is extended or adjusted under 35 U.S.C. 154(b) by 0 days.

(21) Appl. No.: 17/535,139

(22) Filed: Nov. 24, 2021

(65) Prior Publication Data

US 2022/0164787 A1 May 26, 2022

Related U.S. Application Data

(60) Provisional application No. 63/118,205, filed on Nov. 25, 2020, provisional application No. 63/118,211, filed on Nov. 25, 2020, provisional application No. 63/118,185, filed on Nov. 25, 2020, provisional application No. 63/118,197, filed on Nov. 25, 2020.

(51) Int. Cl.
*G06Q 40/00* (2023.01)
*G06Q 20/36* (2012.01)
*G06Q 20/40* (2012.01)

(52) U.S. Cl.
CPC ....... *G06Q 20/367* (2013.01); *G06Q 20/4015* (2020.05)

(58) Field of Classification Search
CPC ..... G06Q 20/00; G06Q 20/327; G06Q 20/206
See application file for complete search history.

(56) References Cited

U.S. PATENT DOCUMENTS

| 8,332,315 | B2 | 12/2012 | Tullis | |
|---|---|---|---|---|
| 8,924,287 | B1 * | 12/2014 | Gailloux | G06Q 30/04 |
| | | | | 705/39 |
| 2009/0271220 | A1 * | 10/2009 | Radoccia | G06Q 10/10 |
| | | | | 705/40 |

(Continued)

OTHER PUBLICATIONS

U.S. Payments Forum (Mobile and Digital Wallets: U.S. Landscape and Strategic Considerations for Merchants and Financial Institutions, https://www.uspaymentsforum.org/wp-content/uploads/2018/01/Mobile-Digital-Wallets-WP-FINAL-Jan. 2018.pdf Jan. 2018) (Year: 2018).*

(Continued)

*Primary Examiner* — Elizabeth H Rosen
*Assistant Examiner* — Mark H Gaw
(74) *Attorney, Agent, or Firm* — IceMiller LLP

(57) ABSTRACT

Electronic transfers of value may be secured via verification of locations of parties, and/or progressive trust building, while maintaining privacy of sensitive personal information of parties via separate communications by parties with a payment network server. Locations may be fixed geolocations, proximities, and/or positions relative to markers/beacons that are in motion. Transfers may be made from party to party, party to place and place to party, and/or party to a virtual point-of-sale at a place. Transferred items may be electronic funds in fiat and/or crypto currencies, Non-Fungible Tokens (NFTs)/data associated NFTs, electronic data, and/or securities/financial instruments, for example. Transactions may be multiparty and may comprise multiple exchanges of value.

20 Claims, 9 Drawing Sheets

(56) References Cited

U.S. PATENT DOCUMENTS

| | | | |
|---|---|---|---|
| 2012/0041877 A1* | 2/2012 | Rao | G06Q 20/363 |
| | | | 705/42 |
| 2012/0290468 A1 | 11/2012 | Benco et al. | |
| 2013/0046692 A1 | 2/2013 | Grigg et al. | |
| 2014/0129428 A1 | 5/2014 | Tyler et al. | |
| 2015/0026056 A1 | 1/2015 | Calman et al. | |
| 2019/0156308 A1* | 5/2019 | Jones | G06Q 20/326 |
| 2021/0264329 A1 | 8/2021 | Barrett et al. | |

OTHER PUBLICATIONS

FASTag Scanner: What is it and How it Works? dated Sep. 21, 2021, posted on webpage https://paytm.com/blog/fastag/fastag-scanner-what-is-it-and-how-it-works/#:~:text=Indian, retrieved from the internet on Mar. 17, 2022.

* cited by examiner

DIGITAL PAYMENTS LINKED TO GEOGRAPHIC LOCATIONS

CROSS-REFERENCE TO RELATED APPLICATIONS

This application claims the benefit of U.S. Provisional Pat. App. Ser. 63/118,185, titled "Systems and methods of digital payments linked to geographic locations," U.S. Provisional Pat. App. Ser. 63/118,197, titled "Temporal and location based digital payment systems and methods," U.S. Provisional Pat. App. Ser. 63/118,205, titled "Systems and methods for reducing fraud in digital payments," and U.S. Provisional Pat. App. Ser. 63/118,211, titled "Virtual terminal for digital payments linked to geographic locations," all filed Nov. 25, 2020, the content of which is hereby incorporated by reference in their entirety BACKGROUND This disclosure pertains to mobile commerce including payments made from and to mobile devices that are secured in view of the geographic location of devices, relative location of devices, and/or proximity of two or more devices.

SUMMARY

Transfers of electronic funds, data, and/or electronic currencies may be secured using location information such as absolute geographic location, relative geographic location, history of travel, and/or proximity of users to each other, beacons, markers, or intermediary devices. Security policies may be dynamically applied on the basis of location, availability of funds, transaction histories, applicable regulations, and security information previously provided by users. Required security information may be obtained progressively from users as needed for particular transactions. For example, more information may be required regarding the identities of parties depending on local requirements for each party, and/or required due to varying detected levels of risk in view of location information.

Transfers of electronic funds, data, and/or electronic currencies may be made among two or more parties. Alternatively, transfers may be made to and from a designated location in transactions involving single users. Further, transfers may be achieved by users in a combination of single-sided transactions involving one or more locations. A user may register ownership of a location for purposes of receiving payments or otherwise making transfers to and from the owned location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings of example scenarios and processes.

DETAILED DESCRIPTION

System Overview

Parties to Transactions

Figure 1:
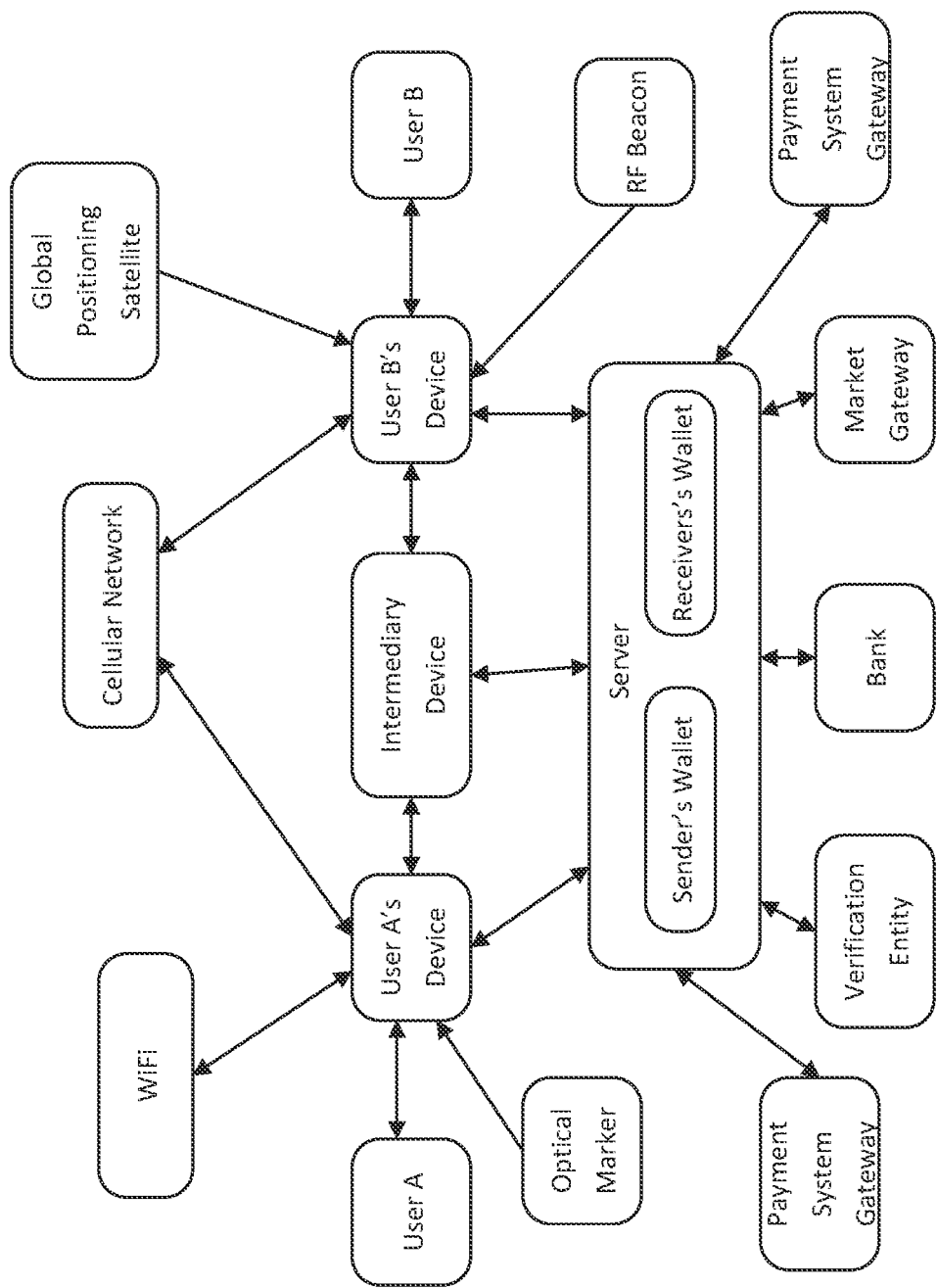
FIG. 1 is a block diagram of a payment network system operating in an environment of location information sources.

FIG. 1 illustrates an example system in which transfers may be secured using location and/or proximity information. In the example of FIG. 1, there are two users, User A and User B, who wish to conduct a transaction. In practice, there could be more parties to the transaction. Alternatively, a transaction may be one sided initially, with one party making a transfer to a place or an object, with or without knowledge of who eventually will become the beneficiary of the transfer, for example.

User Devices

In FIG. 1, each user has a computing device. Each device may be a mobile computing device, such as a smart phone, tablet, or laptop computer, for example. Alternatively, one or of the devices may a non-mobile device such as a desktop computer or digital kiosk.

Payment Network

Each user device is connected via one or more communications network links to a server of a payment network. The payment network server manages an electronic wallet for each user. Each wallet contains information necessary completing a transactions on behalf of each user when properly authorized by said user. The payment network server serves as an arbiter to ensure that exchanges are made into and out of each wallet when properly authorized and verified.

Architecture of Payment Network

It will be appreciated that in practice the functionality of the payment network server may be distributed in any number of physical devices and/or processes operating on computing devices. That is, the payment network is a virtual network of devices that may be interconnect via any communications network technology.

Distribution of Payment Network in Devices

Further, functionality of the payment network server may be partly distributed to user devices and/or intermediary devices. For example, a user device's device may be configured with a software application and/or a web connection whereby the user's device is able to monitor the user's wallet, arrange for external transfers replenish or withdraw from the wallet, prompt the user for information needed to accomplish transactions, and apply rules about whether transactions are permissible.

External Gateways

The payment network server may be connected to any number of external systems gateways. In the example of FIG. 1, the payment network server is connected to a bank, a market gateway, other external payment system gateways, and a verification entity. In the case of managing monetary transfers, for example, such connection may be used to send funds from customer wallets to external accounts, and from which transferred items funds can be pulled from external payment system accounts into customer wallets. The server can move funds between wallets, out a payment system gateway, and in from a payment system gateway. The server can move electronic value in and out the market gateway in many forms, securities, crypto, crypto with associated data (e.g., NFTs), and domain-specific information, such as items of value in a particular computer game or other electronic market.

A third-party entity may be called upon to verify information provided by users and/or present status of accounts. The payment network server may use links to a stock market gateway, a cryptocurrency gateway, and/or a data repository, for example, in the management of various types of electronic transfers.

Intermediary Devices

FIG. 1 also shows an optional intermediary device. This may be an NFC or local network communicating device, or even a WiFi network, that user A's device and user B's device can both see. The intermediary device may be provided by a third party to facilitate transactions between users, e.g., without the third party having any access to transactional information.

Nature of Transactions

Cash Transactions

Transfers may involve electronic funds of standard currency, data, crypto currencies, stocks, instruments, etc., or combinations thereof. For example, to exchange local fiat currency the payment network may make credits and debits to user wallets, then settle to the exchange via communications with user banks and/or other financial institutions.

Crypto Transactions

Similarly, to exchange crypto currencies such as BitCoin and the like, the payment network server may first record exchanges marked with cryptographic signatures in the user's wallets, and then communicate the transfers to an external crypto coin exchange for registration on the public. Alternatively, the payment network may act as the crypto currency exchange. Where the payment network is not acting directly as the crypto currency exchange, crypto currency transactions may be initially logged within the payment network system using its own crypto coin, off of the public blockchain, prior to settling through an external exchange on the public blockchain.

Data Transactions

Users may also use a payment network to move various pieces of data, such as a ticket to attend an event, a coupon, or a token, e.g., setting a token in particular place. For example, movie tickets may be placed by a first user at a certain location for retrieval later by a second user, or the tickets may be sent from one wallet to another. Similarly, the necessary credentials to claim title to a financial instrument may be place at a location or transferred wallet-to-wallet.

Use of Currency in Examples

Herein, exchanges are generally described in terms of currency. However, it will be appreciated that different details apply to different electronic items being transferred. For example, in the case of fiat currency (e.g., U.S. dollars) crypto currency (e.g., BitCoin) Non-fungible Token (NFT) marketable financial instrument (e.g., stock share or bond) and the like, one may speak of moving the item from one wallet to another on the payment network server. However, the same may not apply to, for example, the distribution of software code (e.g., source, object, or FPGA instructions, etc.), coupons, or the like, where the payment network may be used for secure transfer of the item, but secure transfer may not necessarily require removal of the item from the sender's wallet. For simplicity in explaining the examples, cash or its equivalent is assumed, but the reader will appreciate that variations to example processes would apply to different forms of electronic goods being exchanged.

The payment network server can perform currency conversion or other value conversion. For example, each party may prefer to use a different currency. For example, user A could fund the transfer of a crypto currency coin (e.g., an amount of BitCoin) to a user B via the payment system gateway transaction in fiat (e.g., US Dollars) currency. This conversion of value may be suggested by user A, accepted by user B, and enforced by the payment network server.

Positive, Negative, and Zero Values of Items Exchanged

Items exchanged need not have a positive cash value. For example, a receiving party may agree to take on a debt or other negative cash value. This may be done, for example, to give a refund, or to request a payment.

Items may be exchanged which have no value or not certain value. For example, coupons, non-cash rewards, and the like, may be exchanged via the payment network server.

Requirements and Conditions

The payment network server may enforce requirements and conditions set by the parties to a transaction and/or by regulatory bodies. That is, each party and/or the government may set requirements as to the form, documentation, and/or timing of the exchange and the identity and/or character of the parties, such as their role, business status, age, residency, home address, age, current location, bank, billing address, credit card type, account number, etc.

Information required for a transaction involving a particular merchant or other entity, for example, may involve Personally Identifiable Information (PII) (e.g., a customer account number) or contextual information that is specific to that merchant or other entity. Such information may be kept private by the system, including in communications with any third party. For example, a vendor at or near a sporting even may need to know about the season ticket holder status of a customer. The status may be verified by the payment management network and the resulted to the vendor without sharing any PII with the vendor. Similarly, the vendor may require an age check for alcohol sales and receive a binary response from the payment network server—old enough/not old enough under local regulations—without the vendor being permitted to see any identification of the customer or learn the age of the customer any regulatory reporting requirements related to the sale may be managed by the payment network server such that proof of age checking is provided to authorities as required, without jeopardizing the privacy of the information by passing through the vendor's staff or computing equipment. In general, while a great deal of PII may be exchanged with the payment network server to accomplish progressive trust building and/or secure transactions, the PII is exchanged only on an as-needed basis between the payment network server and other parties, rather than requiring parties to exchange sensitive personal information—or even public information which parties prefer to keep confidential—to accomplish an exchange.

Further, transactions may be conditioned on behaviors of the parties. Just as legal and institutional requirements and conditions may be considered in progressive trust building, similar mechanism may be employed to enforce requirements and conditions established by parties to a transaction.

For example, a vendor may have a policy of not extending credit to parties exhibiting risky behavior. Such a condition may exceed the normal conditions applied by the progressive trust building policies of the system in requiring, e.g., additional information to secure transaction based on a transaction risk score computed by the system. A transaction between a vendor and a consumer 18 years of age may be legal in the state where the transaction is conducted but fail to meet a policy of the vendor not to sell to persons under 21, for instance.

Similarly, transactions may be conditioned on user behavior, e.g., such as agreeing to a reciprocal exchange. That is, exchanges may be unidirectional (e.g., a tip,) bi-directional (e.g., electronic payment for an electronic asset,) or multi-faceted, (e.g., purchase of a vehicle to be delivered subsequent to agreeing to payment through the network and proffer of proof of insurance.)

Location

Geographic Location, Relative Location, and Proximity

Each device is able to determine its location. Herein, the term "location" is used to refer to several kinds of information. Location may be an absolute geographical location, e.g., as defined by latitude and longitude or street address, for example. Location may be a relative location, e.g., within a distance of another object. Location may be proximity, e.g., where a device is known to be within a threshold of closeness to another object, or person, whether or not the exact distance is known. A location, for purposes of securing a transaction, may be any one of these, or any combination thereof. For example, a location may be within a radio network cell, at the intersection of Baker Street and Madison Avenue, 30 feet from a marking beacon, next to User B's mobile device. Location may also refer to a history of travel, e.g., a sequence of relative or absolute geolocations, and/or proximities recorded over a period of time.

The payment network server may be able to determine the location of any and/or all devices, e.g., via data obtained from the devices and/or data obtained from other equipment sensing and/or communication with the devices.

Relative locations may be determined in a number of ways. For example, relative location may be determined based on an ascertainable position relative to a verifiable marker, where the absolute position of the marker is not known. For example, a QR marker on a service counter in the dining car of a train may have an uncertain current geolocation, e.g., in route between stops. However, the association between the QR marker and a certain train, certain train car, and even a certain position at the service counter may be derivable either from meta data without the QR code and/or online lookup. Similarly, a special purpose wireless beacon, be it an optical, audio, or radio beacon, for example, may be used to mark a mobile location. For example, a WiFi base station on a vehicle, be it a train, boat, car, bus, etc., may serve as a mobile beacon that may be used by a user device or other equipment to identify a relative location.

Determining Location

Determining location may be done in a variety of ways. In the example of FIG. 1, user A's device receives signals from a WiFi network and a cellular network. User A's device can also use a local optical marker, such as a QR code. Alternatively, not shown, a marker may be a Near Field Communication (NFC) tag, an NFC standalone tag reader, or an NFC subsystem operating on another user's device, for example. Instead of reading the optical marker, for instance, user A's device might sense an RFID tag, an RFID reader, and RFID field of another device like user B's device, or a personal network such a BlueTooth network of the user B's device.

Sources of Location and Other Information

Like user devices, in addition to providing location information, beacons, markers, and intermediary devices, may convey identity, currency, and transfer amount information. For example, a QR code may convey, either directly or by reference to an index, identity information about a potential party to a transfer, amounts and currencies requested, conditions on transfers, and goods being exchanged. An NFC device on a vending cart may provide information on whom to make payment to, prices for different sizes of ice cream treats, and whether the merchant accepts payment in crypto currencies.

Proximity

NFC operations may be said to often provide proximity information, rather than geolocation information, inasmuch as they may only a binary data point: either a user device is within range, or it is not. Multiple cell towers, for example, may be used to triangulate a geolocation of a user who is within a mile of each tower, for example. A low-frequency near-field RFID tag may only provide information when the user's device is within inches of the tag and provide no information about the exact distance. The payment network server may address such ambiguity in location while in the user experience, so that users are not puzzled by the myriad details that may be involved in the payment network server resolving the locations of the parties. Further, some ambiguity in location may be advantageous in keeping from user A the exact location of user B, for example. In practice this helps to inhibit stalkers and other bad actors, for example, from using the payment network for misdeeds.

Signing for Packages

Similarly, a first NFC tag may be used by a person receiving a package to "sign" for the delivery, and a second NFC tag may be presented by a delivery agent to confirm their presence at the delivery. This is in stark contrast to, for example, asking a delivery recipient to sign an LCD display of a mobile computer of a delivery person, where the mobile computer may have no way of verifying the identity of the delivery recipient, or conversely, no way to verify the presence of the correct recipient. This is also distinct from the use of an NFC tag to mark a location.

Sharing Information Sources

In the example of FIG. 1, User B's device receives signals from the same cellular network and from a local RF beacon. User's B's device also has a GPS receiver which is picking up signals from an orbital GPS satellite. Both user devices can see an intermediary device, which may be another mobile device, kiosk, etc., emitting a recognizable radio or optical signal.

Location Information Derived from Networks

Location information may be obtained from networks in a variety of ways. For example, a device connected to a network, whether wirelessly or by a wire or fiber connection, may receive specific information about the location of network hardware and/or a position of the device that has been computer/triangulated by the network. Similarly, a device may be able to infer the identity and location of a network transmitter or an RF beacon, e.g., through one or more of triangulation, lookup, and codes broadcast by the network.

Progressive Location Determination in Progressive Trust Building

As discussed in reference to FIG. 1, there may be many ways to determine the locations of parties to a transaction.

Figure 3:
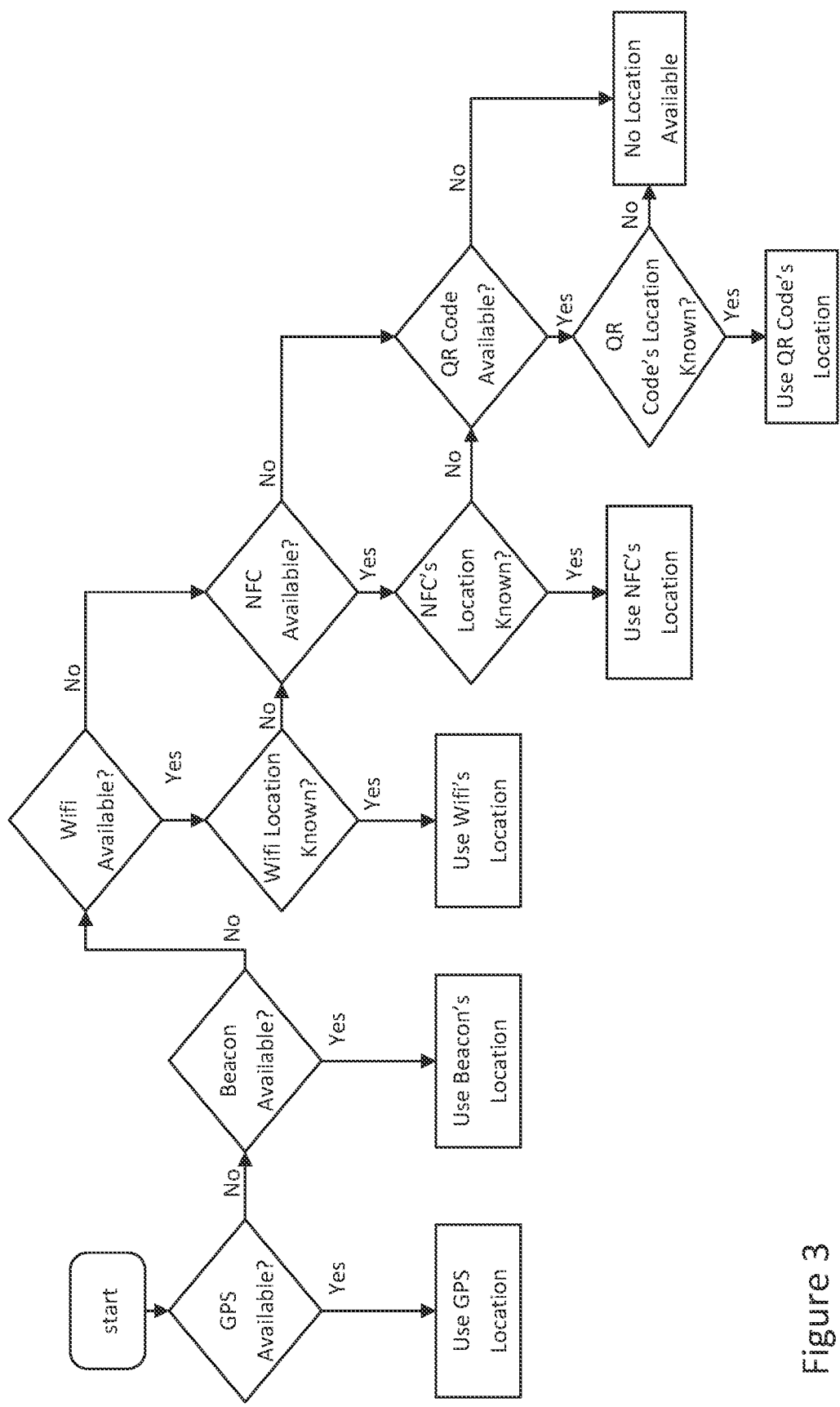
FIG. 3 is a flow chart of a process for progressive location determination.

How location is determined can have an impact on the perceived security risk of a given transaction, and progressive trust building may adjust the requirements and/or prompting of users accordingly. FIG. 3 illustrates an example process by which a location is determined—or found to be indeterminant. At the start of FIG. 3, if the user is using a personal mobile device, the payment network may be able to determine that the user is at least proximate to the device, e.g., by being able to login. The payment network system—including the user devices, intermediary devices, and payment network server, for example—may then seek other sources of information, such as an onboard GPS receiver and navigation capability. The system may consider different sources of location to be in different tiers of reliability for security purposes, e.g., with descending prefer for GPS, beacon, WiFi with known geolocation, WiFi without known geolocation, near-field communication (NFC) in the area, marker (such as a QR code) with a known geolocation, and a marker without a known geolocation.

The quality and number of location information sources may be observed and considered in identifying location and/or determining a risk factor associated with the certainty of location. GPS satellite may provide the best information outdoors, and indoors if signal strength is high enough. Radio transmitters, including special purpose beacon and network transmitters, such as Bluetooth, WiFi, and cellular transmitters, may be used to triangulate position. For example, the relative strengths of multiple Bluetooth signals may be taken into account. The strength of transmitter signals of different technologies may be compared, e.g., using two cell towers, a WiFi signal, and a Bluetooth signal. Note, this triangulation can happen three dimensionally, in addition to two dimensionally. The payment network server may consider relative height difference between two users for example. The payment network server may take into account the radio signal characteristics of various different technologies used. For example, WiFi is often deployed with signals in two frequency ranges which have different capacities for penetrating walls, resulting in different signal strengths and performance characteristics. BlueTooth has a third set of performance characteristics. For example, a user of the payment network staying in a 50-story hotel, the payment network server may compare the relative performance characteristics of the two WiFi signal bands from a single base station, via readings taken at the user device and/or base station, allowing an inference of the number of walls between the user the WiFi base station. BlueTooth does not propagate well through steel-reinforced concrete floors, because may penetrate plaster walls. So, with knowledge of signals available on a particular floor, the system may be able to accurately infer on which floor of the hotel the user is standing with their mobile device.

The example of FIG. 3 nearly spans the terrestrial location identification gamut, with everything from signals from outer space to NFC devices, e.g., within a foot, to direct line of sight with a QR code. Note shown, but also available, is direct electrical or physical contact with an object. That is, progressive trust building can take advantage of progressive location determination, availing itself of information from as far away as space to as close as a QR code on a point-of-sale terminal. Significantly, it can take advantage of several or all of them to verify location, rather than relying on a single source. This make location information much harder to spoof and allows the system to make a well-informed decision about what supplemental security measures may be warranted based on the nature, reliability, and corroboration of location information.

This multi-technology approach enables various anti-spoofing technologies. For example, an ordinary NFC or QR tag may can contain metadata including encoded information regarding the location of the tag and/or an ID value which may be used to lookup the location via a registry on the payment network server. The registry may further contain information about hidden anti-counterfeiting measures applied to the tag, such as hidden ink (security indicia not visible to the naked eye), secondary signals (e.g., and NFC tag hidden by a QR code sticker), or a radio signal to check for (e.g., a broadcast WiFi network name in the vicinity that validates the presence of the QR code.)

The payment network system may take advantage of all situational information available via the user's device or from other sources. For example, if the payment network system cannot directly determine the location of a user, it may, based on the radio, audio, and optical environment of the user's device, and may do so in view of inertial readings of the user's device since the last known position of the user. Depending on chemical sensors of a mobile device, smells may be considered. A person claiming to be standing at carnival in Rio may be distrusted because the phone's microphone detects no street noise, and the infrared camera sensor suggests that the street is frozen. A person supposedly standing before a casting of Rodin's Gates of Hell may be asked to provide a depth-image photo of the sculpture. If available, the payment network may seek confirmation of user's location via facial recognition features of the user's device or other devices in the area, such as surveillance video.

Notably, the location information, through the lens of progressive trust building, can reveal suspicious behavior, e.g., in patterns of transactions and/or disparities between claimed and detected locations.

Progressive Trust Building

The Need for Better Trust Management

Transaction security requirements, including legal requirements such as U.S. Anti-Money Laundering (AML) and Know Your Customer (KYC) regulations, vary depending on such factors as the identities of the parties to a transaction, their current locations, the payment instrument being used, and what actions they have taken in the past. Further, legal requirements are themselves in flux. A user who might have been able to perform an action yesterday may be blocked tomorrow because of a new legal requirement or institutional policy.

Traditionally, this has been addressed in the online payment space by exhaustive user data collection during the onboarding of new users of an app and/or payment network. Data is sought for every scenario user might be able to enter with the app. Typically, this onboarding flow is implemented once, and is not variant per user or situation.

User privacy, the security of personal information, and the user experience of providing personal information may be enhanced in a number of ways. First is to only ask users to provide information that is needed to secure the transactions they actually perform. Second is transparency in letting users know when information is being gathered and doing so in language that consumers can easily understand. Third is the integration of data collection with specific transaction and regulatory requirements. Together, these approaches avoid the collection of unnecessary information upfront when a user joins the payment network and allow dynamic generation of dialogues with users to implement the latest anti-fraud solutions in a timely way. The result goes far beyond traditional "card not present" and online credit card transaction practices.

Upfront questionnaires used in traditional onboarding of users in payment systems are often ineffective in preventing online fraud. Further, users often abandon onboarding due to frustration, the lack of a clear rationale for the information collected, or lack of requested information being immediately available.

Progressive Approach

Transactions may be secured using location information, other information, and verification techniques. To address changing situational requirements of changing locations and circumstances, and to simplify the user onboarding experience, a progressive approach may be used whereby security policies are dynamically applied based on the circumstances of a proposed transaction. Thus, factors such as location, availability of funds, transaction histories, applicable regulations, and security information previously provided by users may be considered. Required security information may be obtained progressively from users as needed for particular transactions.

Different security requirements may apply to different actions that a user may request to be performed by the payment network. For example, each action may have a different associated data, location, and/or user status requirements, such that each action may require different information and/or a different verification requirement. Security requirements may be relative, absolute, and/or combinatorial. For example, a relative security requirement may be a requirement that depends on an overall risk assessment score for a proposed transaction. An absolute requirement may be, for instance, a minimum age of a user to perform a certain type of transaction. Combinations of requirements may include, for instance, that both user A and user B must meet a set of absolute or relative requirements in certain ways before allowing user A to perform a transaction with user B.

Information requirements may be presented to the user in a continuous process, as opposed to, or in addition to, a one-time gate procedure before using the application. For example, information requirements may be presented as required, rather than upfront. The payment network server may enforce these rules on a per user basis. Further, requirements may be updated at the payment network server dynamically, in near real time. e.g., in response to aggregate user behavior, administrator controls, we can update these rules in real-time.

The integration of data collection with specific transaction and regulatory requirements may be achieved, for example, using an extensible software-implemented Finite State Machine (FSM).

An FSM, acting on information provided to populate "states," may provide either deterministic or non-deterministic assessments. For example, a deterministic assessment may be that a person is not authorized to conduct a particular transaction due to their age. A non-deterministic example is a risk score for a given user. In practice, non-deterministic assessment may then feed into a deterministic assessment, e.g., when a loan at a certain level is denied due to a risk score exceeding a certain threshold.

Notably, such assessments, whether rendered by an FSM or other automated means, can be used not only to render final transaction decisions, but also to coordinate progressive trust building dialogues with users of the payment network. Different user attempting to perform identical transactions, for example, may be asked different additional security or personal data questions—or no questions— depending on such variables as location, history of historical transactions, payment instruments, system usage thresholds, and timing issues, etc., in view of the current proposed transaction, identities of the parties, and applicable regulations.

Notably, the state of each party may be considered, both separately and in combination. Thus, for example, a user who was able to perform a certain transaction with a first vendor on the basis of information previously provided, may be challenged to provide additional information before conducting a nearly identical transaction with a second vendor. Hence, the personal information and history of each party may be weighed separately or jointly when checking what requirements pertain in a particular situation.

Mobile electronic devices, such as cell phones, tablets, laptops, and special purpose devices, can provide accurate dynamic location information which can then be used to secure transactions. Traditional location tracking for credit cards, in contrast, was limited to inferring a change in general location over time by inference from card data, based on often inaccurate or outdated database of locations of merchant POS terminals, or registration by user, e.g., of their vacation plans. The lack of automatic (or automatically verifiable) location information, however, rendered traditional solutions highly error prone. Progressive trust building can accommodate changes in your present location by initiating new procedures and/or new dialogues as required.

Similarly, progressive trust building may be adapted relative locations of parties to a transaction. For example, in a transaction between two users using cell phones, the closeness—or distance—of the users can be used as factor in determining risks associated with the transaction and remediation of the risk via progressive trust building. Similarly, the proximity of a cell phone of a first user to a point-of-sale device, marker, or intermediary device, and/or the geographic location of the cell phone, point-of-sale device, marker, or intermediary device, may be taken into account for purposes of progressive trust building.

The payment instrument may, in combination with location factors such as proximity, for example, play a part in determining the progressive trust building steps required for a particular transaction. For some transactions, close proximity between users may be required for the transaction to proceed. For example, if a crypto coin is to be passed from the mobile device of a payer to the mobile device of a receiver using Bluetooth, as opposed to using the Internet via cellular data or WiFi, the short range (e.g., ~10 m) Bluetooth link may used for progressive trust building, e.g., by having the sender's device issue a challenge via Bluetooth to the receiver and receive a response from the receiver, verifying proximity prior to completing the transaction. This case may require a different dialogue with the users than is used in other circumstances. Further, the mechanism for moving the crypto coin into and out of their phone may vary by user, and different approaches to registering the transaction on the public blockchain, if desired, may require different security protocols and different dialogues with the users.

Example Progressive Trust Building Flow

Figure 2:
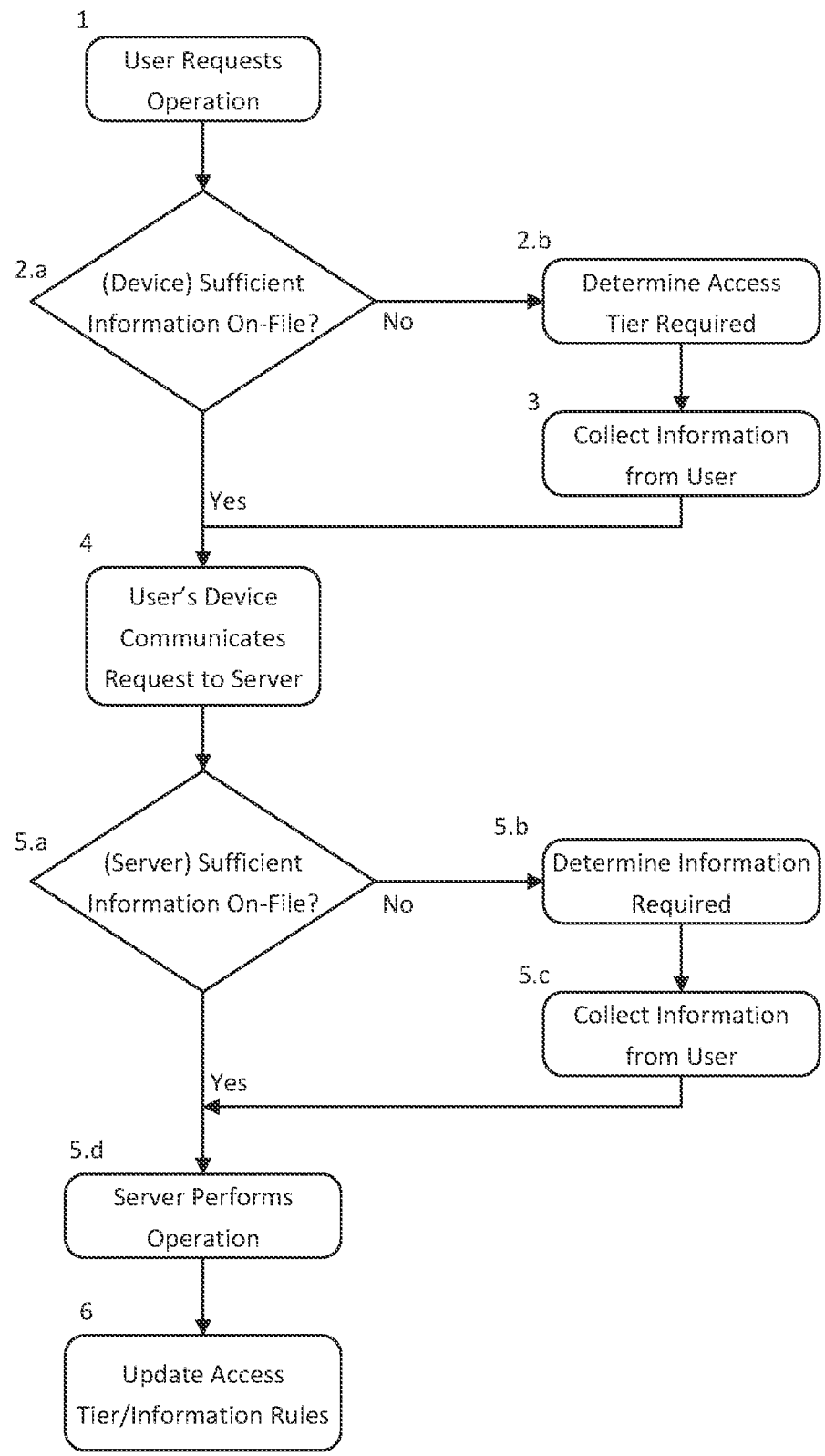
FIG. 2 is a flow chart of a process for progressive trust building.

FIG. 2 is a flow chart of an example set of operations for reducing fraud in digital payments through progressive trust building. The operations may be performed on a payment network server and/or devices such as those described in reference to FIG. 1. In addition to the user wallets, the payment network server may have a user database which stores user activity, transactions, and user profiles. A user profile may include both verified and unverified information about a specific user. Unverified information, for example, may be accepted for a transaction with lower security requirements, whereas the same information may need to be verified for use in a transaction with higher security requirements.

In step 1 of FIG. 2, a user attempts to initiate a payment network operation from their user device. In step 2, the payment network system compares information which has been collected about the user with requirements of the payment network for the operation.

Payment network system functions may be distributed in a number of ways. For example, the comparison of user information to the information requirements for a particular operation may be performed in the user device, in the payment server, or by the user device acting in concert with the payment network.

The sufficiency of the user information available for the operation may be determined using a set of tiers to identify sets of equivalent security requirements. For example, in Tier 1, the lowest tier, the user may be required to enter an email address. Tier 2 may require verification of the email address. The use of tiers may facilitate the use of alternative means to achieve a level of verification. For example, providing a phone number may be accepted as the equivalent of providing an email address for purposes of meeting a Tier 1 requirement.

Thus here, "tiers" is meant in the sense of equivalent levels of security for purposes of different kinds of transactions. Each user may achieve approval by the system for transactions of a certain kind via different combinations of information, for example. A particular set of user profile information required, at a minimum, for a user at one tier may have nothing to do with what is required for other users at a higher tier.

In the example of FIG. 2, at step 2*a* an initial determination of the sufficiency of information is conducted in the user device, and at set 5. a a further determination is made at the payment network server. If in step 2*a*, if the device determines that sufficient information is not available to secure the transaction, then in step 2*b* the device determines what level of information is required.

The required information may be tiered, whereby transactions are divided into different security tiers, and the data collected is collected to meet the requirements of a tier. In practice, individual types of transactions may have unique requirements, and individual transactions may raise unique requirements. Nonetheless, the use of tiers provides the opportunity to accept alternative equivalent information. For example, a verified telephone number may be accepted in lieu of a verified email address at one tier, both may be required at a higher tier, and an unverified phone number or unverified email address may be accepted at a lower tier.

In step 3, the user's device prompts the user for any additional information needed for the transaction, Alternatively or additionally, depending the nature of the information to be collected, the user device may contact a third party for verification and/or additional data.

In step 4, once device believes the user has sufficient information on-file, it communicates the request for the operation to the payment network server.

Then in step 5*a*, the payment network server further verifies that the user has sufficient information on-file for the action requested based on the rules stored there. If sufficient information is not available, then in step 5*b* the payment network server may determine what information, or tier of information, is required, and in step 5*c* instruct the user's device to collect additional information.

In step 5*d*, if sufficient information is available, the payment network server completes the action requested by the user's device. This may involve making adjustments to user's wallets and/or conveying information to external financial system gateways, crypto currency exchanges, data storage locations, and the like.

In step 6, based on the behavior of the user, the payment network system may update rules associated with that individual user, or a class of users that includes the individual user, and may propagate such rules to one or more user devices.

No Onboarding Per Se

Notably, the user experience with the payment network system depicted in FIG. 1 and FIG. 2 need not involve any traditional onboarding process, e.g., involving the entry of credit card, banking, financial, or other sensitive personal information upfront. Rather, in the course of progressive trust building, the payment network server may require the entry of such information, but only as required for specific transactions that the user wishes to conduct, in the context of the transaction. Similarly, security authorization may be achieved at various tiers or for various purposes through, for example, multi-factor authentication, the delivery of nonces, password protection, proof of receipt of delivery of postal service at a given address, etc., yet such precautions may be invoked as required, rather than at the time of first usage of the payment network server or a related web site or user device software application.

The same information may be collected in different orders in different situations, as may be required for a transaction. For example, in a routine purchase scenario, a buyer may be asked to provide a verified email after they completed their payment to optionally send them a receipt. However, in a large value person to person transaction, a verified email may be required before the transaction as a security measure. In either case, using progressive trust building, if the verified email were already available to the payment network server, the user experience for the transaction would not require, and therefore not include, asking for the email address.

Identifying Targets

Figure 4:
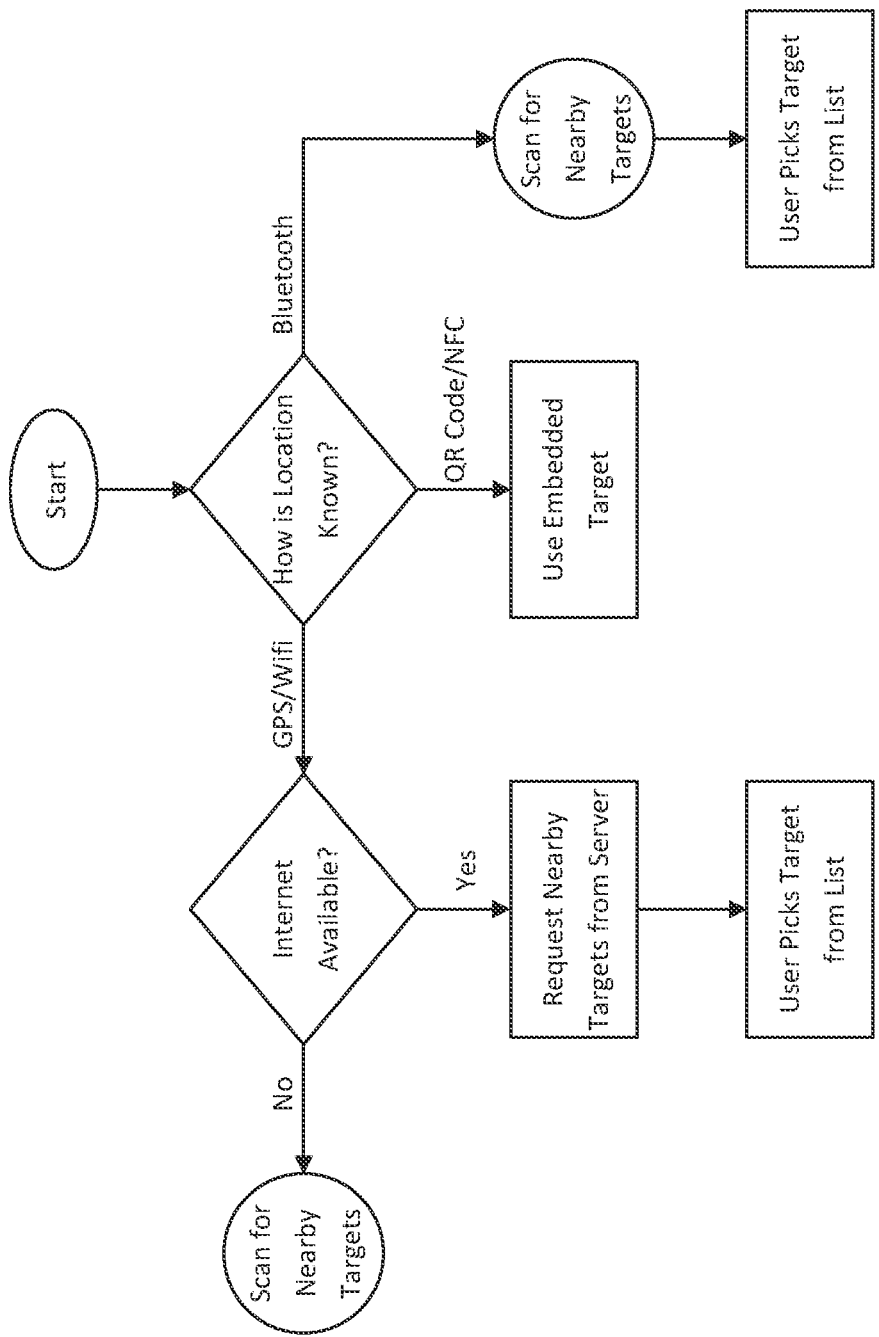
FIG. 4 is a flow chart of a process for identifying transaction targets.

A user's device, acting alone or in combination with the payment network server, may identify likely targets for a transaction. How this is done may depend on how the location of the user device was determined, as illustrated in FIG. 4. For example, if a user's device has access to a GPS or WiFi location information, and the user device has Internet access, the user's device may retrieve a list of nearby targets from the payment network server. This is may reduce user device battery usage and provide the payment network server with real-time information about user activities. If the user device does not have Internet connectivity, the user device may use Bluetooth to scan for nearby targets.

The search may start when the user has identified a target that she has in mind. Alternatively, the user's device may search for potential targets generally available in the vicinity of the user. In either case, the user's device may we present the user with a list of potential targets, when there is more than one, and ask the user to pick the target with which the user wishes to perform a transaction.

Determination of proximity and target may be combined. For example, a first user's device may learn to transfer funds or other items based on scanning a QR code or other indicia displayed or broadcast by another user's device. For instance, the first user may know nothing about the second user other than the fact that, obviously, the QR code displayed is displayed on the phone of the person they intend to pay. If the payment network server accepts the displayed QR code as legitimate, the transaction can be completed with the speed, convenience, anonymity, and privacy of a cash exchange, with the added advantage of an automatic record for the first user and the second user of the time, place, currency of exchange, and amount.

Setting Transaction Amounts

Figure 5:
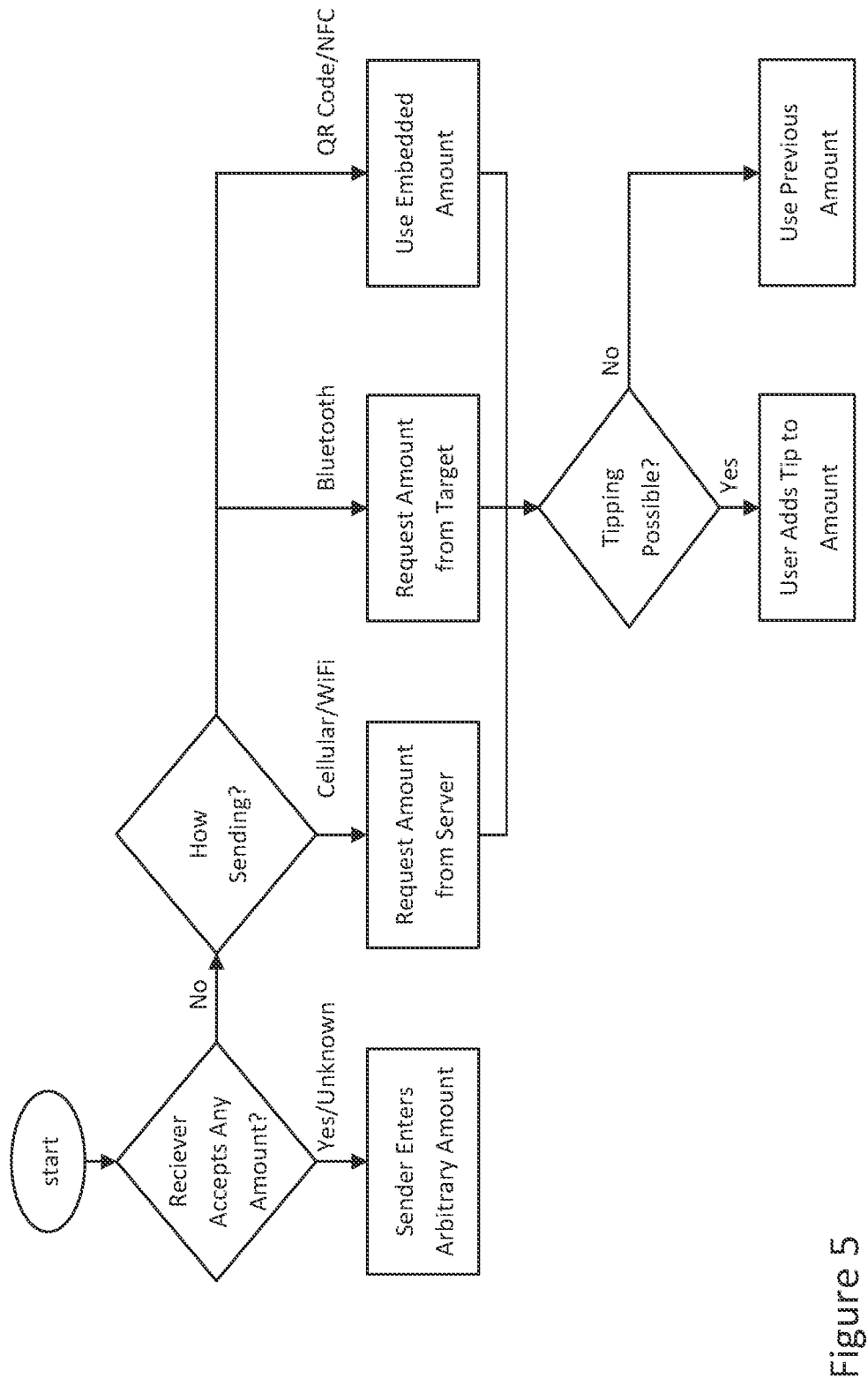
FIG. 5 is a flow chart of a process for determining a transaction amount.

The exact transfer may be set by one user or negotiated by the parties to the transaction. Again, the details of the interaction may affect perceived security risks and thereby trigger progressive trust building responses by the system. In the example of FIG. 5, a user who intends to send funds has selected target to receive the funds. The sender's user device and/or the payment network server may first check whether the target, who will receive the funds, has restrictions on the amounts they will accept, e.g., a minimum, a maximum, or a fixed amount. If not, e.g., for a gratuitous transfer or where the sender knows the amount to be paid, the sender may enter the desired amount of the transaction on their user device.

Alternatively, the sender may not know the exact amount that the recipient expects. For example, a diner in a restaurant may request a total bill or an item charge in a number of ways. The diner may receive a printed bill or an electronic notice of a bill amount. The diner's device may be able to use an Internet connection, e.g., via a cellular or WiFi connection, to receive an electronic tally from the restaurant. The diner's device may be able to form a short-range connection, e.g., via Bluetooth, to a device controlled by the restaurant. The diner may also find the price by reading a QR code or NFC tag or device. In the latter case, the amount may be gotten either from data within the QR code of NFC tag or device directly, or by referencing an identity of the QR code of NFC tag or device online, for example.

As in the restaurant example, the sender may be able to add a gratuity to a base amount requested by the receiver. In the example of FIG. 5, the user has the option of adding a tip before completing the purchase.

Splitting the Bill

The example of TC5 assumes that two parties are involved—one sender and one receiver. But even in the simple case of a restaurant bill, this may not be the case. For example, assume that a group of people have decided to split the bill evening, and one diner in the group, acting as host, has agreed to coordinate paying the restaurant. The host announces to each other diner what their share would be, and the other diners each makes a payment to the host. The host is spared exchanging personal information with the other diners—in fact may strongly prefer not to exchanges personal information such as phone numbers, emails, or even their real name with fellow diners whom the host has just eaten. Instead, in a collection of side transactions, the host can collect funds from each of the other diners, through the payment network system on the basis of location, e.g., co-location in the restaurant/proximity of the host and the other diners. Once funds are received, the host may then pay the bill. The payment network system may manage this as a collection of unrelated transactions or, for convenience, provide an interface on the hosts device to track the number and number of payments received toward ultimate payment of the bill.

Specificity in Tipping

User control of payments allows addressing complex payment scenarios with ease and flexibility. For example, a group dining together may agree to level of tipping suggested by a host. However, an individual diner may separately leave an additional tip through the payment network system.

Similarly, in the case of home delivery, where traditionally a single tip is given to the delivery service, users may tip the delivery service separately from the restaurant. For example, a well-prepared meal may deserve a high tip, and sloppy delivery may merit a low tip. Rather than trusting the delivery service to share a gratuity equitably with restaurant staff, the person receiving the delivery can create separate transactions, potentially, for payments to the restaurant and the delivery staff and tips to the restaurant staff and delivery staff. By decoupling traditionally bundled transactions, the payment network described herein may generally provide more efficient ways to reward good work and good products more directly than primary mechanisms allowed.

Tips may be directly routed to the server via the payment network server. For example, a single transaction may involve multiple parties, e.g., a diner, a restaurant, and wait staff. The restaurant and the wait staff may each receive funds directly from the diner independently via the payment network server. The payment of the bill to the restaurant would not depend the wait staff entering payment from the diner, and the tip payment of the tip would not require approval from the restaurant, or even the restaurant knowing the amount of the tip. Each is paid independent of information about the other's information, and without their consent. This ensures that the restaurant gets proper funds for the bill, and the diner can rest assured that the tip that they send goes entirely to the server without interference by the restaurant. Tips can be directed to pooled and divided in a number of ways, e.g., being directed to all restaurant staff and/or to kitchen staff, table staff, and/or individual servers.

Security Checks

Progressive trust building provides for dynamic checking of location, identity, and circumstances of parties before permitting a transaction to be executed. In a restaurant example, an underage user of the system may be permitted to check a price by scanning a QR code with her personal mobile device, but the underage user, under local law, may be prohibited from acting as host or otherwise effecting an electronic funds transfer to pay the bill.

Similarly, checks may be performed dynamically on the basis of information known to the payment network system, e.g., in a sender's user device or in the payment network server, or in information provided by the receiver. For example, it may be required that a user be at least 18 years of age to conduct any electronic funds transfer, but may need to be 21 to purchase liquor. The payment network server may be aware both that the user is 19 years of age and that the point-of-sale (POS) system targeted for payment resides in a liquor store and disqualify the transaction accordingly.

Alternatively, the payment network server may know that the POS resides in a liquor store, but not know the age of the user. Using progressive trust building, the payment network system may then prompt the user for their age and any other information necessary to verify the user's age.

Further, the payment network system may know neither the age of the user nor the nature of the exchange until prompted by the receiver that the transaction requires proof that the user is over a certain age, whereby the system then prompts for an age check.

Similarly, the payment network system may dynamically prompt for any information necessary to perfect transaction, e.g., as to class of identity (retailer, non-profit, registered broker, etc.), legal residency, citizenship, class of merchandise (alcohol, tobacco, firearms, pharmaceuticals, explosives, dangerous materials).

Alternative Pathways for Executing Transfers

Figure 6:
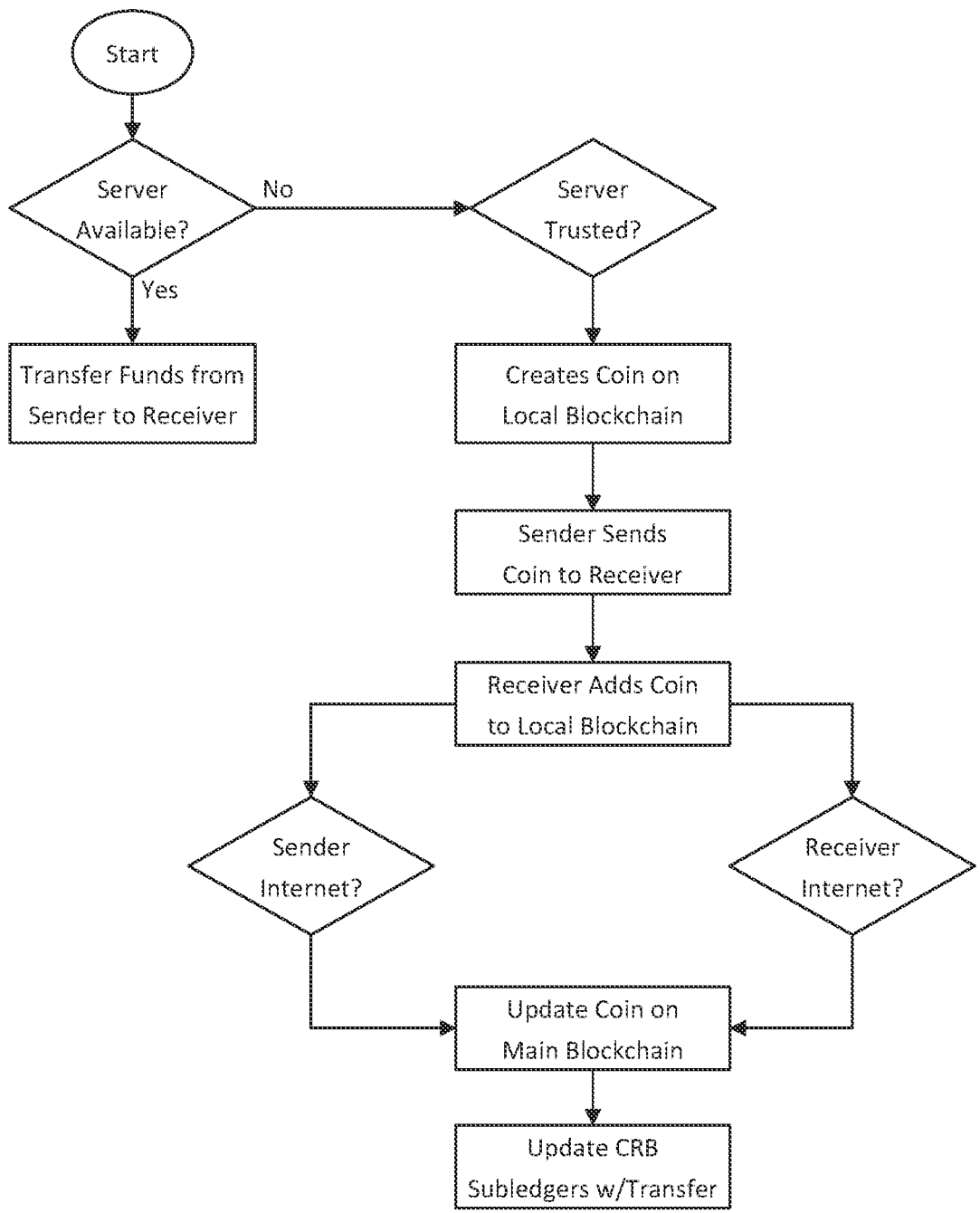
FIG. 6 is a flow chart of a process for transferring a payment.

FIG. 6 illustrates alternative paths for completing a transaction depending on whether user devices have connectivity to the payment network server. Normally, transactions are recorded at the time of agreement of any needed parties to the transaction. The parties indicate their intention to the payment network server, which then may make any necessary adjustments to user wallets and records, update any needed details for future actions and/or details of the transaction.

However, if an Internet connection to the payment network server is not available, the transaction may occur in two parts. First, a record of the transaction may be created cryptographically on one or both of the user devices. For example, user devices maybe able to use NFC and/or personal network technology such as Bluetooth to exchange sufficient information to form a signed cryptographic record/ledger entry of the transaction. Later, when connections to the payment network server are restored, the cryptographic record may be used to verify the interaction between the users and execute the exchange on the payment network server.

The recording of a transaction offline does not guarantee that the transaction will be approved by the payment network server. For example, details of the transaction may require, under progressive trust building, further interaction with the users to secure the transaction. Alternatively, it may be found that the proposed transaction cannot be permitted under law/local regulations, for example.

Transaction Fees

For simplicity, herein examples are given wherein the transfers of value are at par. That is, a receiver receives the amount sent by the sender, and a merchant receives the amount paid by a shopper, etc. However, in practice it will be understood that the amount received by one party may be adjusted by the system in a number of ways. For example, the payment network server may deduct transaction fees on a fixed and/or percentile basis. Further currency conversion rates, and associated fees, as well as other fees and service charges may apply.

Location Based Transactions

As described in connection with FIGS. 1-6, a payment network may be used to securely transfer money, data, crypto currency, and other electronic items between people, businesses, and other organizations. The payment network may be used, for example, for payments, donations, tipping, bill-splitting, in lieu of cash, while providing the convenience, privacy, and anonymity of a cash. Using progressive trust building and/or progressive location determination, for example, the routing of funds or other electronic items may be secured without the sender or receiver being aware of personal information about each other, such as account numbers, identity, online persona or handle, email address, or telephone number, etc., while fully complying with applicable commercial, financial, or other regulatory requirements.

Figure 7:
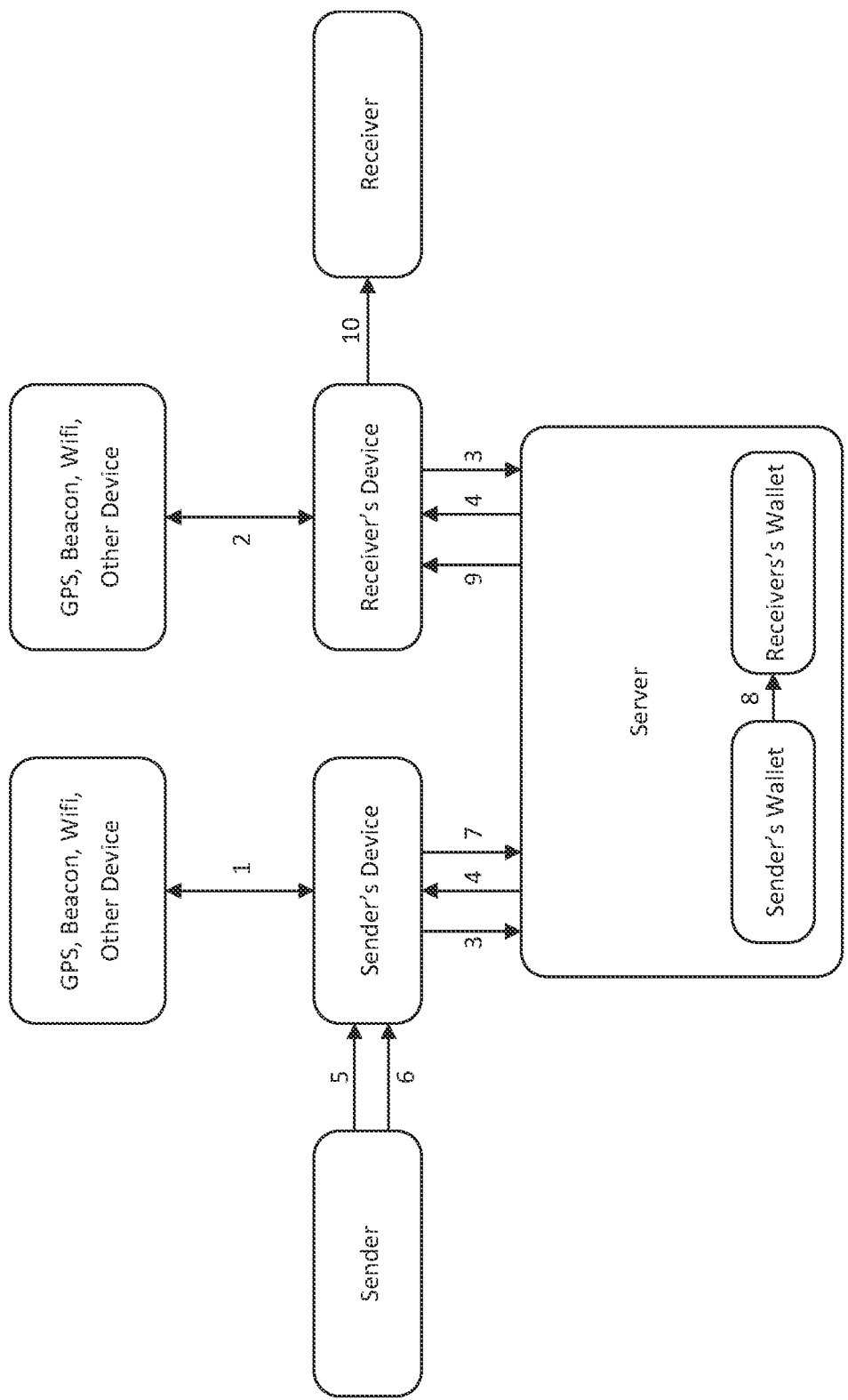
FIG. 7 is a block diagram of a transfer between users of a payment network.

The elements of FIG. 7 are similar to those described in connection with FIG. 1. FIG. 7 illustrates an example set of interactions between two users—a sender and a receiver. Each has a computing device that may be a mobile device, such as a smart phone, tablet, or laptop computer, for example, or another device such as a desktop computer. Each device is able determine its location.

In the example of FIG. 7, each device has access to different location information source. Each location information source may be a GPS signal, a beacon, WiFi network signal, or a connection to another device or system.

Each user device is linked via one or more network connections to a server of a payment network. The server has an electronic wallet for each user. Each wallet contains information necessary for determining the availability of funds or other items for completing a transaction on behalf of the user, and for completing the transaction when properly authorized by the user. The server provides arbitration and management of each user wallet.

Not shown in FIG. 7, users may begin use of the payment network in a number of ways. For example, they may enroll via a website, by downloading a software application to their mobile device, in person, over the phone, or some combination therefore, e.g., via the use of multi-factor authentication. In lieu of traditional onboarding, a user may simply start using the system and, following progressive trust building procedures such as those described in connection with FIG. 2, provide any information required for a particular transaction as required.

Also not shown in FIG. 7 are gateways external to the payment network through which funds or other items may be sent from customer wallets to external accounts, and from which funds or other items can be pulled from external accounts into customer wallets. The server can move funds between wallets, out to an external system gateway, and in from an external system gateway.

Each user device is equipped to facilitate location-based transaction, e.g., via downloading software and/or website instructions for accessing various subsystems of the user device. Location-based transactions may be based on the proximity of two user devices to each other, and/or the proximity of at least one of the devices to a physical location, e.g., as determined via progressive location determination operations such as those described in connection to FIG. 3.

As discussed in reference to FIG. 4, user devices may detect and identify in a number of ways. A device may detect the presence of another device directly via radio or optical sensing or signalling, e.g., via personal radio networks such as Bluetooth. A device may detect the presence of another indirectly, e.g., via information received from a network about the presence of another device.

The presence of other devices may be qualified by the participation of devices on a certain payment network, e.g., a PayTile network, whereby each device registered on the payment network is arranged to confirm to certain location-based transaction, security, privacy, and/or anonymity protocol. For example, a device may determine whether a qualified device is in its proximity either via direct communications with the device, communications with a local intermediary device, or via a network connection.

As discussed in reference to FIG. 5, the details of an exchange may be determined and/or negotiated in a number of ways, e.g., by requesting information on an asked price and/or adding a tip.

As discussed in reference to FIG. 2, location-based transactions may be qualified by the association of one or more devices with a physical location. For example, prior to performing a transaction, a first device may determine its location and then determine which other devices on the payment network are associated with the location.

As discussed in reference to FIG. 3, a user device may determine its physical location in a number of ways. The location may be an absolute geographic location, whereby the device may learn of its position via GPS signals or similar navigational tools, detection of a marker, beacon, and/or network signal associated with a fixed location. For example, a QR code may mark a location. An intermediary device, e.g., a device that is associated with the payment network but not with a specific user of the payment network, may also serve to mark a fixed location.

The location may be a relative location, whereby the device may learn of its location relative to a beacon, network signal, marker, or intermediary device that may be in motion and/or not associated with a fixed location. In this manner, for example, without known its geographic position, a device may still become aware of its relative location as aboard a vehicle, for example, or in the presence of a transient item.

QR codes and/or other signals or indicia presented by user and/or intermediary devices may be used to convey transaction details, identify parties for purposes of a transaction, and/or prove proximity of users to a location or to each other.

Example Location-Based Transaction Flow

Figure 8:
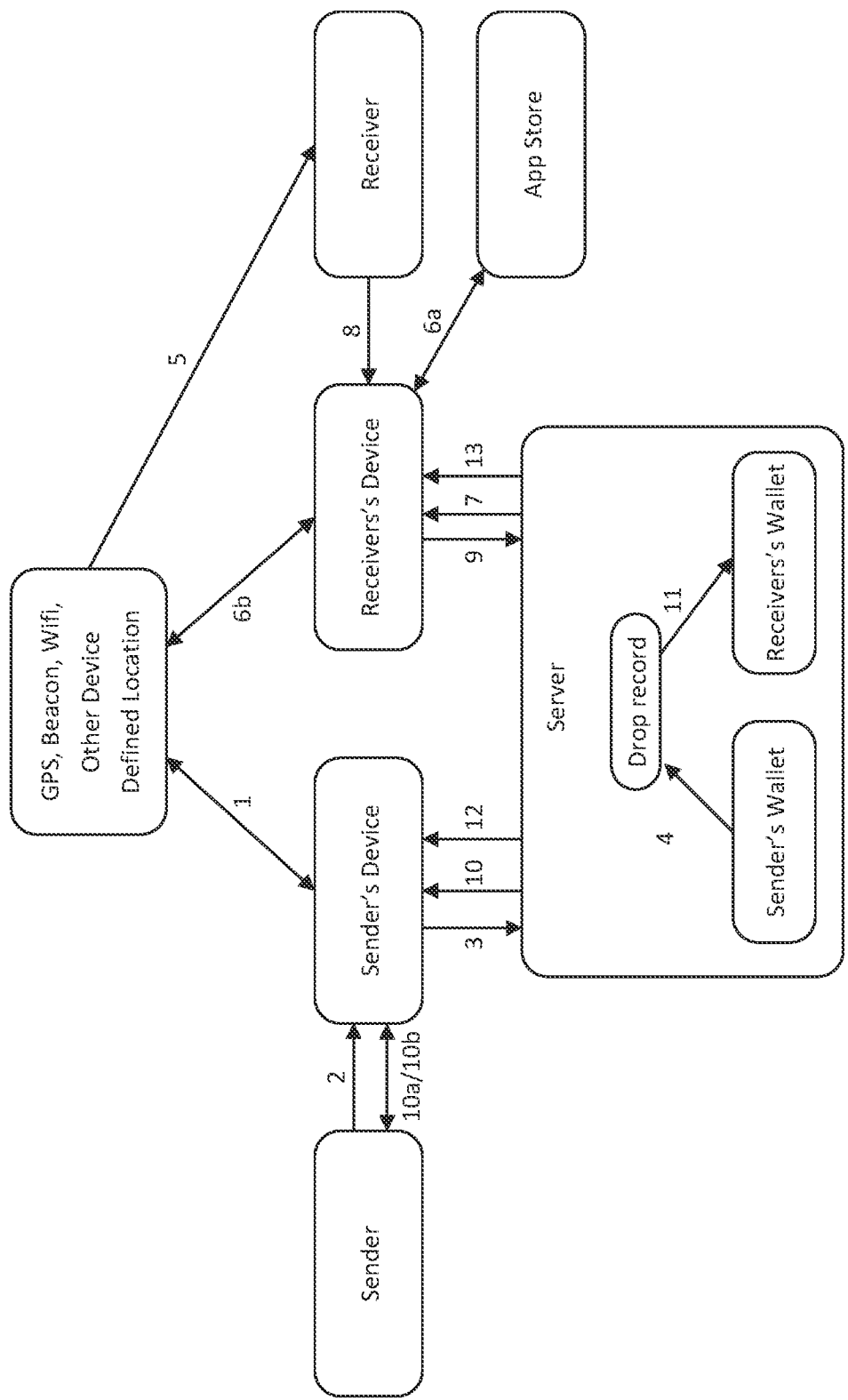
FIG. 8 is a block diagram of a "money drop," where a location serves as a holder of value.
Figure 9:
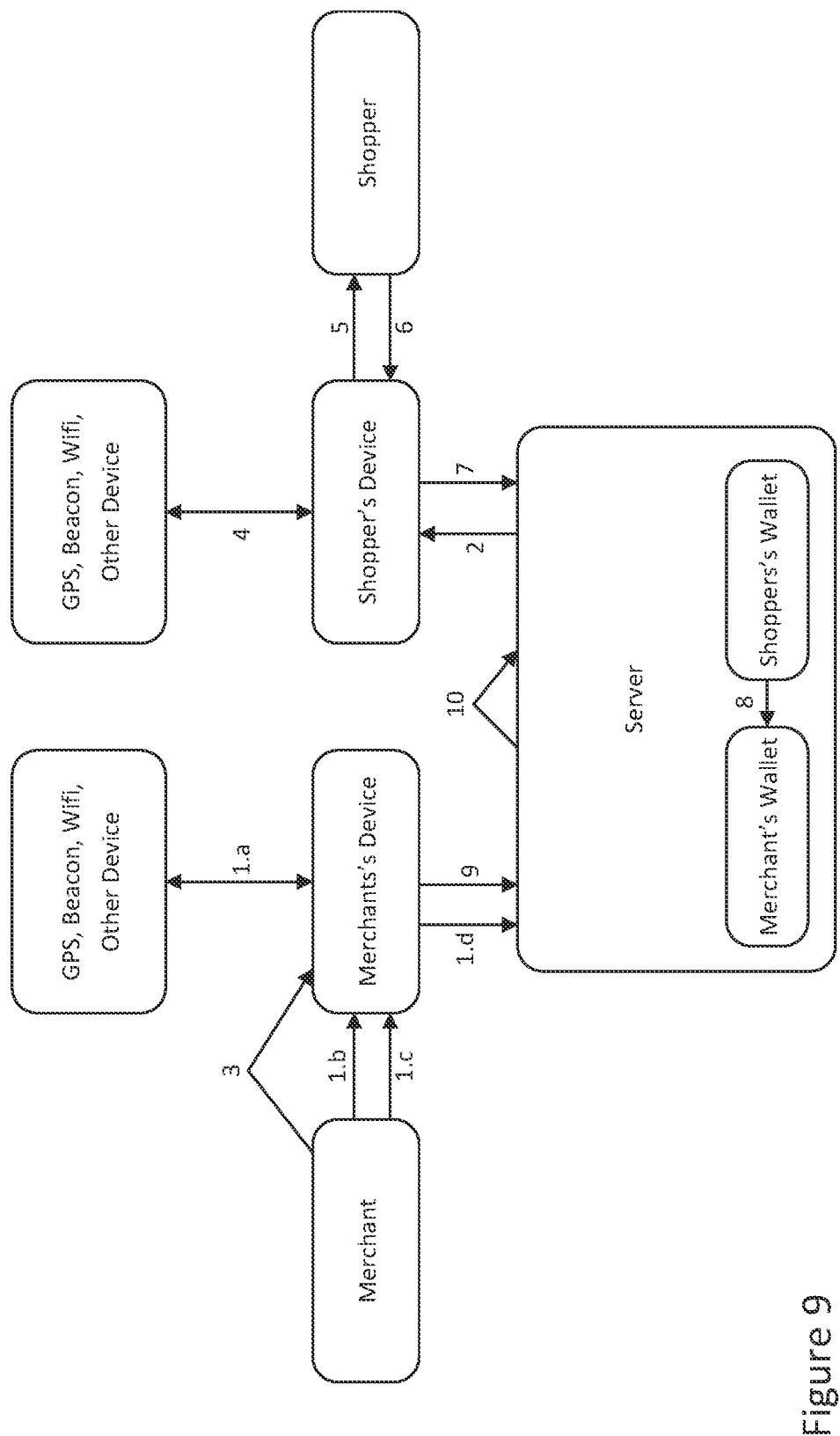
FIG. 9 is a block diagram of a "virtual point-of-sale," where a location is registered to a user for a business purpose.

Note that while the operations in FIGS. 7-9 are numbered, in practice the operations described may take a wide variety of sequences. Further, depending on circumstances and the nature of a transfer, some steps may be omitted while others, not depicted may be required, e.g., to accomplish progressive trust building, progressive location determination, perfect transfers internal to the payment network (e.g., obtain signatures), and/or perfect transfers to entities/institutions outside of the payment network (e.g., fully execute stock trades.)

In the example of FIG. 1A, in a location-based transaction, money is sent directly from the wallet of a sender to the wallet of a receiver via the payment network. Here it is assumed that both users have mobile user devices adapted for communications with the payment network server.

In operation 1 of FIG. 1A, the sender's device determines its location and/or proximity to other devices. In the example of FIG. 1A this is done via a sensing and/or connection to a location information source, such as a GPS signal, beacon, WiFi signal, etc. Alternatively, the sender's device may determine its location via communications with a network, such as the network that connects the sender's device to the network. Further, the sender's device may learn of its proximity to another device via communications with a network and/or via sensing or direct communications with the other device, e.g., via a short-range radio and/or optical sensing or networks. In operation 2, the receiver's device determines its location via similar means.

In operation 3, each device reports its location and to the payment network server. Each device may also report other proximate user device and/or intermediary devices that it has discovered at its location.

In operation 4, the payment network server informs each device about the other. Alternatively, the devices may already have been in communication, and not need confirmation from the payment network server. However, it may be advantageous, for security, privacy, and anonymity, for example, for each device to receive confirmation from the payment network server regarding the membership and/or standing of the other device on the payment network, and/or confirmation of the association of the other device with the location.

In operation 5, the sender selects the receiver on their device, and in operation 6 selects how much to send to the receiver. The sender's device may have a record of the sender's available balance and/or be adapted to permit the sender to arrange for sufficient funds to become available on the payment network server in the sender's wallet.

In operation 7, the sender's device communicates, to the payment network server, the intention to make a payment to the recipient. Again, if sufficient funds are not available to support the transaction, the sender's wallet may be replenished via operations not shown in FIG. 7.

In operation 8, the payment network server removes the intended amount from the sender's wallet and adds that amount to the receiver's wallet. In operation 9, the receiver's device is notified by the payment network server that receiver's wallet has additional funds, and in operation 10, the receiver is notified by the receiver's device that the receiver has received additional funds in their wallet.

Many variations in the details and/or sequence of operations depicted in FIG. 7 will be understood in view of the discussions of FIGS. 1-6.

Money Drop

As discussed in reference to FIG. 7, transfers between user wallets may be secured using progressive trust building and location information. Alternatively, transfers may be made to and from locations. That is, a transfer may be made into or out of a wallet maintained by the payment network server for a place, as opposed to a legal person, and conditions for further transactions with the location wallet can be associated with the location wallet.

Such transactions may take several forms. For example, a "money drop" may be made by a first user to a location with no conditions on whom may retrieve funds dropped at the location. Consider the example of diners splitting the bill at a restaurant. Imagine that one of the diners has not used the payment network does not have a mobile device on them. They promise verbally to repay the host by leaving a payment at an agreed location—a lamppost on the street near the restaurant. The next morning, the promiser returns to the lamppost with her cell phone and drops her share of funds, via the payment network, to a wallet for the lamppost. That afternoon, the dinner host returns to the lamppost and retrieves the dropped funds into host's wallet. Via progressive trust building, the identities of the parties are determined to the satisfaction of the financial system in accordance with local regulations. Via progressive location determination, the presence of both parties at the lamppost is assured, albeit the parties may be at the location at different times.

This is just one example. A number of variations are possible, e.g., as to the locations, the time, and earmarking of the funds. For example, especially in the example of FIG. 7, mutual presence at a location can be an important factor for trust between two parties. However, location is also an important factor in determining that any party using the payment network is who they say they are. So, for a money drop, where simultaneous presence of parties at a single location is not contemplated per se, the location of the drop may be different from the location of either party at the time of the drop. A person in China may drop funds for a person in England at the observation deck of the Eifel Tower.

Among the conditions that may be set for retrieving the funds, e.g., any business rules to be applied, are time limits and the presentation of credentials. A money drop may be indefinite in time, or expire rapidly, with funds returned to the sender at expiration.

A drop may be made to a location with the condition that only the legal owner of the location may retrieve the drop. That is, rather than merely using the location to mark a virtual transaction, the intent of the depositor may be that the deposit be intended for the legal person owning the land on which the drop is signified as located. This allows a form of tipping, for instance, without requiring depositor to know to whom the place belongs, while tying the ultimate transfer to place's owner.

The retriever may need to present a credential, or no credential. For example, the drop may be free to anyone who discovers it via the payment network. Or the drop may be locked, to be opened only by the verified owner of a certain public key, for instance. Or a simple keyword may be used. The sender may communicate to the intended recipient that they money is at a location, to be retrieved upon presenting the password, "Joshua21," for example.

Alternatively, approval of the collection of a drop may be conditioned on approval, e.g., in real-time or near real-time, by the person who dropped the money. For example, the depositor may decide whether to approve collection of the drop based on public information about the person picking up the money. For example, a camera may provide an image of the person attempting to make the pickup to a depositor who left the scene an hour before. From the image, the depositor can decide whether the person attempting the pickup look like the valet whom the depositor intended to tip.

Thus, the payment network may be used for transactions with locations, whereby exchanges of money, data, crypto currency, or other electronic items may occur asynchronously without requiring all users to currently be on the network, present, or even have access to the network at the time a deposit is made to a drop site. A payment network money drop is a kind of virtual tip jar, whereby a sender places money at a location, be it a specific geolocation, a relative location, or proximity to a marking object, while allowing the depositor, if desired, to retain some control over who retrieves the deposit and/or a time limit for doing so.

This extends the located-based payments system into the 4th dimension by providing a temporal element, enabling scenarios including future payments, geographically based loyalty programs, and thus a potentially "viral" customer acquisition method. That is, techniques applied to treasure hunt games, for instance, may now be applied to any electronic transfer while meeting the security expectations accorded financial transaction and the privacy and anonymity now sought by consumers.

Example Money Drop Flow

FIG. 8 illustrates an example operations for a money drop. The objects depicted are similar to those described in connection to FIG. 1 and FIG. 7, and the progressive trust building, progressive location determination, etc., described in connection to FIGS. 2-6 may be applied here as well. In the example of FIG. 8, only one source of location information is depicted. However, as explained in reference to FIG. 3, any number of sources of location information may be involved. Further, the sender and the receiver may be a different locations entirely.

In the example of FIG. 8, money is being sent indirectly from a sending user to a receiving user via a "money drop" deposit associated with a location. Again, the money may be ear-marked for a specific receiver by conditions applied to the deposit by the sender, or the drop may be free for retrieval by whoever claims it first. Similarly, the deposit may be made with time restrictions for its retrieval, e.g., by a certain time or during certain hours, and/or according to other business rules.

In operation 1 of FIG. 8, the sender's device determines its location and/or other proximate devices on the payment network, e.g., as described in connection with FIG. 3.

In operation 2, the sender selects how much to money or other electronic items to drop at a location. The drop location may be the same as, or distinct from, the location of the sender at the time of the drop.

In operation 3, the sender's device sends to the payment network server drop information including, e.g., the nature/amount of the drop, the drop location, and conditions applying to the retrieval of the drop, if any. In operation 4, the payment network server removes the amount from the sender's wallet and retains information pertinent to the drop in a drop record.

In operation 5, the receiver comes to the drop location. In operation 6*a*, if the receiver is not already a member of the payment for purposes of receiving a money drop, the receiver may connect their device to the payment network by installing a software application, e.g., a mobile device app from an online app store. Optionally the receiver may initiate progressive trust building, e.g., for the purposes of eventually receiving funds or other items in the drop into the receiver's bank account or other repository. Alternatively, the receiver may wait until prompted by progressive trust building for any information necessary to complete a requested action. Note that operation 6*a* may apply in any situation where a new user wishes to use the payment network, e.g., in any connection with the operations described herein, e.g., in reference to any of Figures of TC1-9.

In operation 6*b* of FIG. 8, the receiver's device determines its location, e.g., using progressive location determination as described in connection with FIG. 3.

In operation 7 of FIG. 8, the payment network server tells the receiver's device that there is a money drop nearby. Optionally, not shown in FIG. 8, the receiver's device can also query the payment network server for information regarding any nearby money drops. Again, this may occur prior to the receiver arriving at the drop location, or afterward.

In operation 8, the receiver selects the money drop to pick up. In operation 9, the receiver's device sends, to the payment network server, a request to pick up the money drop.

In operation 10, optionally the payment network server communicates this request to the sender's device and requests the sender's approval. The sender can then elect to approve the pickup or deny it. If the sender denies the request, the sender's device communicates this to the payment network server, and the money drop remains there for another receiver to attempt to pick it up. If the sender approves, the sender's device communicates the approval to the payment network server, and the receiver is authorized to pick up the money drop.

In operation 11, the payment network server adds the drop content to the receiver's wallet. In operation 12, the payment network server communicates to the sender's device that the drop items have been collected. In operation 13, the payment network server communicates to the receiver's device that they have the drop contents, e.g., funds. In operation 14, the receiver is notified by the receiver's device that they have received the drop contents in their wallet.

The sender's and receiver's geographic proximity is sufficient to send the funds even if the sender and receiver are not present at the same location at the same time. Furthermore, the sender has control over who receives the funds, if they want, or they can just let anyone pick up the funds. Lastly, senders have the ability to cancel a money drop before completion, and control over how long a money drop is present before drop contents are returned back to the wallet of the sender if no one picks up the drop.

Conditioning on Route Taken/Locations Visited

The pickup of a drop may be conditioned on meeting complex criteria, including criteria pertaining to presence at several locations over time. For example, a portion of the drop may be set at each of several locations to be visited. Alternatively, all of the drop may be paid upon visiting the last of a list of locations (e.g., a treasure hunt.) Further, the drop may be paid upon visiting a list of locations in a prescribed sequence, (e.g., a dog walker's route.)

Virtual Point-of-Sale (Pos) Terminal

The techniques described herein may be used to operate a virtual point-of-sale (POS) terminal having several advantages over traditional hardware-based POS terminals. Conventional POS terminals are often costly and, owing to Payment Card Industry Data Security Standard (PCI DSS) requirements, for example, may be cumbersome in operation. Further, the use of specialized POS hardware entails expensive software development and/or customization and maintenance.

Alternatively, a virtual POS terminal for digital transfers may be associated with a location, whereby a business, service, or other entity can register at a location, so that they can exchange money, data, or crypto currencies via the payment network without requiring any physical POS terminal at that location. The processes for progressive trust building and other operations described in reference to FIGS. 2-6 would apply equally here, where users conducting transactions with the virtual POS have equipment similar to that described in connection to FIG. 1, for instance.

For example, a merchant may receive a payment to their virtual POS and receive notices of payments on their mobile device, e.g., their cell phone, without needing any special POS hardware. The merchant would not even need to have a cash box or make change. Payments to the virtual POS may be routed to the merchant's payment network wallet and be withdrawable from the payment network wallet using either a mobile device or a desktop web browser, for example. This eliminates the need for the merchant have any complex or expensive point of sale terminal, while providing equivalent functionality to all parties. Further, patrons of the virtual POS would not have to provide an private information, such as credit card numbers or contact information, to the merchant, nor would the merchant with protecting the security of such personal information of their customers.

Example Virtual POS Operations

FIG. 9 illustrates operations of a payment network system involving a virtual POS. The elements of FIG. 9 are similar to those described in reference to FIG. 1 and FIGS. 6-8. In the example of FIG. 9, there are two users of the payment network system—a shopper and a merchant. Each user has a computing device, with the ability to determine its location, e.g., via sensing and/or connecting with a source of location information. Each user has an associated wallet managed by the payment network server which stores their funds and/or other means for exchanging value.

Here in the example of FIG. 9, not shown, the payment network server maintains a virtual POS record with an associated profile. The virtual POS may have a static geo-location or be mobile. The payment network system may maintain rules about when and how the virtual POS may move, for example.

Each user's computing device can detect its own location, e.g., either directly, via a location specific intermediary device, or via a satellite-based positioning system, or via arbitration via the payment network server.

In the example of FIG. 9, a number of locations may be involved. First is the location where the merchant is at the time of registering the virtual POS with the payment network. Second is the location where the virtual POS operates in the vicinity of the shopper. Third are future locations where the virtual POS may be moved on another occasion.

In operations 1*a*-1*d* of FIG. 9, the merchant registers their location with the payment network. In operation 1*a*, the merchant's device determines its location, e.g., via sensing and/or communications with a source of location information. In operation 1*b*, the merchant's device collects any necessary onboarding information from the merchant as may be required for receiving funds from the payment network, such as bank account information.

In operation 1*c*, the merchant's device collects any further necessary onboarding information for the merchant to register as the owner of a virtual POS. For example, under local regulations, a merchant may be required to provide a tax identification number.

In operation 1*d*, the merchant's device communicates the device's location and onboarding information to the payment network server. Not shown in FIG. 9, in the course of progressive trust building the payment network may request further information to be provided by the merchant via the merchant's device.

Further, the payment network server may undertake a number of operations to register the merchant as owner of a place of business using a virtual POS, as may be required by local regulations. For example, the payment network server may contact third parties for additional information and/or verification of the merchant's onboarding information prior to registering the merchant as the owner of the virtual POS.

Notably, the payment network may make use of the physical location of the merchant at the time of registering the virtual POS, which may be different to the location near the shopper where the POS is eventually used, to secure the registration process.

Not shown in FIG. 9, steps 1*a* to 1*d* may be repeated in part when the merchant wishes to change the location of the virtual POS. For example, a merchant may operate at one location during the week (e.g., a road-side stand) and at a different location (e.g., a farmer's market) each Saturday morning.

Once the virtual POS is registered, the payment network server may make the merchant's virtual POS visible to members of the payment network. In the example of FIG. 9, this is illustrated by operation 2, in which the payment network server sends virtual POS information to the shopper's device. The virtual POS information may include a notification of the presence of the virtual POS nearby the sender's device, for example, and optionally include with information regarding the business conducted at the virtual POS. Which members of the payment network receive information regarding the virtual POS may be based on a number business rules, e.g., pertaining to the proximity of the virtual POS to the sender, affiliation of the place of payment, and/or preferences of the sender.

In operation 3, after registering the virtual POS at the present location, the merchant may turn off their device, removing it from the payment network. The virtual POS registration may, nonetheless, remain in place for use by shoppers. The functionality of the virtual POS, from the shopper's perspective, resides in the payment network server, not in the merchant's device.

For instance, this functionality is useful for non-profit organizations who are receiving donations via the payment network server. Such organizations may want to always be able to receive funds, without limiting or controlling how much they receive in any given transaction. In addition, if desired, a user may leave their device on, so that payment network server can provide them real-time information about funds coming in.

The shopper's device determines its location by sensing and/or communicating with a source of location information in operation 4. The source of location information used in operation 4 may be different from the source of location information used by the merchant in the original registration and may further be different from the source of location information used by the merchant in communicating the current location of the virtual POS to the payment network server.

In operation 5, the shopper's device shows the merchant's virtual POS to the shopper. For example, the shopper's device, which received information about the virtual POS in operation 2, may wait until the device has determined that is has entered the vicinity of the virtual POS, via operation 4, to tell the shopper about the virtual POS. Alternatively, the shopper may learn about the virtual POS, e.g., via a QR code or tag at a booth operated by the merchant.

In operation 6, the shopper selects an amount of money to send to the merchant's virtual POS. Either party may control the amount transferred for a particular transaction. For example, the conditions of a transaction may be "pay what you like," e.g., where a church goer selects their own donation amount, or a museum goer sets their own admission price. At a food truck, however, the shopper may be required to pay the prices listed on the menu by the merchant. Accordingly, the payment network server can tell the shopper how much to send in step 6 or allow the user to send whatever the, e.g., based on a configuration selected by the merchant for use on the payment network server.

In the example of FIG. 9, in operation 7 the shopper's device communicates the amount to be sent the merchant's virtual POS to the payment network server. In operation 8, The payment network server transfers funds from the shopper's wallet to the merchant virtual POS's wallet. In operation 9, the merchant may periodically connect their device to the payment network to check the status of payments.

In addition, visual signalling may be used. For example, the shopper's device may display an indication that payment as been made, which the shopper may show to the merchant in order to complete the sale. That is, the virtual POS may operate primarily through interactions with the shopper's device. The merchant's device may be offline, turned off, or absent while the transactions are executed, without sacrificing the security of the financial exchange for either the shopper or the merchant.

In operation 10, the payment network server may extend a time limit for operation of the virtual POS. For example, a virtual POS may be deregistered, permanently or temporarily, due to a period of shopper inactivity or of the merchant's device being offline.

While the example of FIG. 9 is presented in the context of a merchant collecting funds from shoppers, it will be appreciated that techniques described may be applied in a wide variety of scenarios, e.g., where data or crypto currency is exchanged instead of money, and/or where the users play different roles, such as the distributor and consumer of digital coupons.

The use of a virtual POS may facilitate customer loyalty programs which respect shoppers' privacy, e.g., by recording information about the shopper's purchase history and/or other information, without requiring the issuance of another customer loyalty card or asking for the shopper's phone number or other Personally Identifiable Information (PII.)

Similarly, shoppers may agree to share information about purchases, preferences, and/or program status for activity of the shopper away from the virtual POS. For example, a merchant may wish to offer a discount to season ticket holders at a nearby sports arena, and the shopper may agree to let the payment network share such information with the merchant or, more specifically, with the virtual POS operations. Through progressive location determination, location may be very precisely determined, such that a shopper at a specific position along a counter may be identified, without requiring the shopper to present identification such as a loyalty card. Preferences may be communicated similarly, such that a shopper entering a line triggers the preparation of their favorite order, without their having to reach the counter to enter the order. Customer experiences can be tailored and refined over time by recording not just the time of purchases, but specifics of the items bought and where the purchase occurred.

We claim:

1. A payment network server, comprising a processor, communication circuitry, a memory, and computer-executable instructions stored in the memory which, when executed by the processor, cause the payment network server to:

receive, from a first mobile user device (sender device) associated with a first user (sender), a first indication comprising an intention to deposit funds electronically at a first location (drop location) in a first amount;

receive, from the sender device, a second indication comprising a confirmation of a current presence of the sender device at a second location;

determine a risk factor associated based on a certainty of at least one of the first location and the second location;

determine, based on (1) a first database of users of the payment network server; (2) a second database of regulatory requirements; and (3) the risk factor, whether sufficient information is available to the payment network server about the sender device to securely make a deposit to the drop location and, if not, engage the sender device in a first dialogue to acquire necessary missing information;

if sufficient information is available to the payment network server, deposit, from a first wallet to a second wallet, funds in the amount of the first notification, wherein the first wallet is associated with the sender and the second wallet is associated with the drop location, and wherein the wallets reside electronically in the payment network server;

receive, from a second mobile user device (receiver device) associated with a second user (receiver), a third indication comprising a confirmation of a current presence of the receiver device at the drop location;

receive, from the receiver device, a fourth indication comprising a request to withdraw fund from the second wallet;

utilizing a special purpose wireless beacon to identify a relative location of one or more of the first mobile user device and the second mobile user device, wherein the relative location is determine to be located in proximity to the special purpose wireless beacon, wherein the special purpose wireless beacon comprises an optical, audio, or radio beacon configured to mark a mobile location to determine the relative location of one or more of the first mobile user device and the second mobile user device, and wherein the one or more of the first mobile user device and the second mobile user device is configured to infer the identity of the special purpose wireless beacon through one or more of triangulation, lookup, and codes broadcast by the network;

determine, based on the first database, the second database, and one or more of the relative location and the current presence of the receiver device at the drop location, whether sufficient information is available to the payment network server about the receiver to securely conduct a withdrawal from the second wallet and, if not, engage the receiver in a second dialogue to acquire necessary missing information;

if sufficient information is available to the payment network server, transfer, from the second wallet a third wallet, funds in the amount of the first notification, wherein the third wallet is associated with the receiver and resides electronically in the payment network server;

transfer, at the request of the sender, funds into or out of the first wallet via a first external financial system gateway; and transfer, at the request of the receiver, funds into or out of the second wallet via a second external financial system gateway, whereby:

if sufficient information is available to the payment network server, transfers from the first wallet to the second wallet and from the second wallet to the third wallet occur without requiring personally identifiable information associated with the receiver being sent to the payment network server from the sender device and without requiring personal identifiable information associated with the sender being sent to the payment network server from the receiver device.

2. The payment network server of claim 1, wherein personally identifiable information comprises a phone number, name, online person, email address, web address, postal mailing address, residence, or credit card or other account number.

3. The payment network server of claim 2, wherein the drop location is a fixed geolocation.

4. The payment network server of claim 2, wherein the drop location is a proximity to the sender device.

5. The payment network server of claim 2, wherein the drop location is a position relative to a mobile beacon.

6. The payment network server of claim 2, wherein the instructions further cause the payment network server to:
receive, from the sender device, one or more conditions for withdrawals from the second wallet; and
determine whether sufficient information is available to the payment network server about the receiver to securely conduct a withdrawal from the second wallet is further based on the conditions for withdrawals from the second wallet.

7. The payment network server apparatus of claim 6, wherein:
the drop location is a fixed geolocation; and
the conditions for withdrawals from the second wallet comprise a requirement for withdrawal by an owner and/or a legal occupant of the drop location.

8. A payment network server, comprising a processor, communication circuitry, a memory, and computer-executable instructions stored in the memory which, when executed by the processor, cause the payment network server to:
receive, from a first mobile user device (sender device) associated with a first user (sender), a first indication comprising an intention to deposit funds electronically at a first location (drop location) in a first amount;
determine, based on a first database of users of the payment network server and a second database of regulatory requirements, whether sufficient information is available to the payment network server about the sender device to securely make a deposit to the drop location and, if not, engage the sender device in a first dialogue to acquire necessary missing information;
if sufficient information is available to the payment network server, deposit, from a first wallet to a second wallet, funds in the amount of the first notification, wherein the first wallet is associated with the sender and the second wallet is associated with the drop location, and wherein the wallets reside electronically in the payment network server;
receive, from a second mobile user device (receiver device) associated with a second user (receiver), a third indication comprising a confirmation of a current presence of the receiver device at the drop location;
receive, from the receiver device, a fourth indication comprising a request to withdraw fund from the second wallet;
creating a cryptographic ledger record of the transaction on one or both of the user devices based on a short-range signal from at least one of the first mobile user device or the second mobile user device;
utilize a special purpose wireless beacon to identify a relative location of one or more of the first mobile user device and the second mobile user device, wherein the relative location is determine to be located in proximity to the special purpose wireless beacon, wherein the special purpose wireless beacon comprises an optical, audio, or radio beacon configured to mark a mobile location to determine the relative location of one or more of the first mobile user device and the second mobile user device, and wherein the one or more of the first mobile user device and the second mobile user device is configured to infer the identity of the special purpose wireless beacon through one or more of triangulation, lookup, and codes broadcast by the network;
determine, based on the first database, the second database, and one or more of the relative location and the cryptographic ledger record, whether sufficient information is available to the payment network server about the receiver to securely conduct a withdrawal from the second wallet and, if not, engage the receiver in a second dialogue to acquire necessary missing information;
if sufficient information is available to the payment network server, transfer, from the second wallet a third wallet, funds in the amount of the first notification, wherein the third wallet is associated with the receiver and resides electronically in the payment network server;
transfer, at the request of the sender, funds into or out of the first wallet via a first external financial system gateway; and
transfer, at the request of the receiver, funds into or out of the second wallet via a second external financial system gateway, whereby:
  if sufficient information is available to the payment network server, transfers from the first wallet to the second wallet and from the second wallet to the third wallet occur without requiring personally identifiable information associated with the receiver being sent to the payment network server from the sender device and without requiring personal identifiable information associated with the sender being sent to the payment network server from the receiver device.

9. The payment network server of claim 8, wherein personally identifiable information comprises a phone number, name, online person, email address, web address, postal mailing address, residence, or credit card or other account number.

10. The payment network server of claim 9, wherein the drop location is a fixed geolocation.

11. The payment network server of claim 9, wherein the drop location is a proximity to the sender device.

12. The payment network server of claim 9, wherein the drop location is a position relative to a mobile beacon.

13. The payment network server of claim 9, wherein the instructions further cause the payment network server to:
  receive, from the sender device, one or more conditions for withdrawals from the second wallet; and
  determine whether sufficient information is available to the payment network server about the receiver to securely conduct a withdrawal from the second wallet is further based on the conditions for withdrawals from the second wallet.

14. The payment network server apparatus of claim 13, wherein:
  the drop location is a fixed geolocation; and
  the conditions for withdrawals from the second wallet comprise a requirement for withdrawal by an owner and/or a legal occupant of the drop location.

15. A payment network server, comprising a processor, communication circuitry, a memory, and computer-executable instructions stored in the memory which, when executed by the processor, cause the payment network server to:
  receive, from a first mobile user device (sender device) associated with a first user (sender), a first indication comprising an intention to deposit funds electronically at a first location (drop location) in a first amount;
  determine, based on a first database of users of the payment network server and a second database of regulatory requirements, whether sufficient information is available to the payment network server about the sender device to securely make a deposit to the drop location and, if not, engage the sender device in a first dialogue to acquire necessary missing information;
  if sufficient information is available to the payment network server, deposit, from a first wallet to a second wallet, funds in the amount of the first notification, wherein the first wallet is associated with the sender and the second wallet is associated with the drop location, and wherein the wallets reside electronically in the payment network server;
  receive, from a second mobile user device (receiver device) associated with a second user (receiver), a third indication comprising a confirmation of a current presence of the receiver device at the drop location;
  receive, from the receiver device, a fourth indication comprising a request to withdraw fund from the second wallet;
  utilizing a special purpose wireless beacon to identify a relative location of one or more of the first mobile user device and the second mobile user device, wherein the relative location is determine to be located in proximity to the special purpose wireless beacon, wherein the special purpose wireless beacon comprises an optical, audio, or radio beacon configured to mark a mobile location to determine the relative location of one or more of the first mobile user device and the second mobile user device, and wherein the one or more of the first mobile user device and the second mobile user device is configured to infer the identity of the special purpose wireless beacon through one or more of triangulation, lookup, and codes broadcast by the network;
  determine, based on the first database, the second database, and the relative location, whether sufficient information is available to the payment network server about the receiver to securely conduct a withdrawal from the second wallet and, if not, engage the receiver in a second dialogue to acquire necessary missing information;
  if sufficient information is available to the payment network server, transfer, from the second wallet a third wallet, funds in the amount of the first notification, wherein the third wallet is associated with the receiver and resides electronically in the payment network server;
  transfer, at the request of the sender, funds into or out of the first wallet via a first external financial system gateway; and
  transfer, at the request of the receiver, funds into or out of the second wallet via a second external financial system gateway;
whereby:
  if sufficient information is available to the payment network server, transfers from the first wallet to the second wallet and from the second wallet to the third wallet occur without requiring personally identifiable information associated with the receiver being sent to the payment network server from the sender device and without requiring personal identifiable information associated with the sender being sent to the payment network server from the receiver device.

16. The payment network server of claim 15, wherein personally identifiable information comprises a phone number, name, online person, email address, web address, postal mailing address, residence, or credit card or other account number.

17. The payment network server of claim 16, wherein the drop location is a fixed geolocation.

18. The payment network server of claim 16, wherein the drop location is a proximity to the sender device.

19. The payment network server of claim 16, wherein the instructions further cause the payment network server to:
  receive, from the sender device, one or more conditions for withdrawals from the second wallet; and
  determine whether sufficient information is available to the payment network server about the receiver to securely conduct a withdrawal from the second wallet is further based on the conditions for withdrawals from the second wallet.

20. The payment network server apparatus of claim 19, wherein:
   the drop location is a fixed geolocation; and
   the conditions for withdrawals from the second wallet comprise a requirement for withdrawal by an owner and/or a legal occupant of the drop location.

\* \* \* \* \*